(12) United States Patent
Ahn et al.

(10) Patent No.: US 12,713,022 B2
(45) Date of Patent: Aug. 18, 2026

(54) VIDEO CODING METHOD AND APPARATUS

(71) Applicant: SAMSUNG ELECTRONICS CO., LTD., Suwon-si (KR)

(72) Inventors: Yongjo Ahn, Seoul (KR); Donggyu Sim, Seoul (KR); Hochan Ryu, Seoul (KR); Seanae Park, Seoul (KR); Woong Lim, Uijeongbu-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 18/973,688

(22) Filed: Dec. 9, 2024

(65) Prior Publication Data

US 2025/0193397 A1 Jun. 12, 2025

Related U.S. Application Data

(63) Continuation of application No. 18/381,715, filed on Oct. 19, 2023, now Pat. No. 12,273,518, which is a (Continued)

(30) Foreign Application Priority Data

Mar. 11, 2016 (KR) ........................ 10-2016-0029699
Mar. 17, 2016 (KR) ........................ 10-2016-0031800

(Continued)

(51) Int. Cl.

*H04N 19/124* (2014.01)
*H04N 19/105* (2014.01)

(Continued)

(52) U.S. Cl.

CPC ......... *H04N 19/124* (2014.11); *H04N 19/105* (2014.11); *H04N 19/11* (2014.11);

(Continued)

(58) Field of Classification Search

CPC .... H04N 19/105; H04N 19/184; H04N 19/91; H04N 19/124; H04N 19/176;

(Continued)

(56) References Cited

U.S. PATENT DOCUMENTS 8,792,547 B2 7/2014 Min et al.
9,609,343 B1 3/2017 Chen et al.

(Continued)

FOREIGN PATENT DOCUMENTS

CN 101682774 A 3/2010
CN 102484703 A 5/2012

(Continued)

OTHER PUBLICATIONS

Amin Zheng et al., Adaptive Block Coding Order for Intra Prediction in HEVC, IEEE; Transactions on Circuits and Systems for Video Technology, vol. 26, No. 11 (Nov. 18, 2015).

(Continued)

*Primary Examiner* — Neil R Mikeska
(74) *Attorney, Agent, or Firm* — Sughrue Mion, PLLC

(57) ABSTRACT

The present invention relates to a method and apparatus for performing encoding and decoding using a variably-sized quantization coefficient group, in quantization coefficient group encoding and decoding of video compression technology.

11 Claims, 47 Drawing Sheets

Related U.S. Application Data continuation of application No. 17/872,577, filed on Jul. 25, 2022, now Pat. No. 11,838,509, which is a continuation of application No. 16/881,786, filed on May 22, 2020, now Pat. No. 11,438,591, which is a continuation of application No. 16/084,105, filed as application No. PCT/KR2017/002578 on Mar. 9, 2017, now Pat. No. 10,694,184.

(30) Foreign Application Priority Data

Mar. 30, 2016 (KR) ........................ 10-2016-0038075
Apr. 21, 2016 (KR) ........................ 10-2016-0048883
May 3, 2016 (KR) ........................ 10-2016-0054609

(51) Int. Cl.
*H04N 19/11* (2014.01)
*H04N 19/136* (2014.01)
*H04N 19/176* (2014.01)
*H04N 19/184* (2014.01)
*H04N 19/52* (2014.01)
*H04N 19/593* (2014.01)
*H04N 19/91* (2014.01)

(52) U.S. Cl.
CPC ......... *H04N 19/136* (2014.11); *H04N 19/176* (2014.11); *H04N 19/184* (2014.11); *H04N 19/52* (2014.11); *H04N 19/593* (2014.11); *H04N 19/91* (2014.11)

(58) Field of Classification Search
CPC ...... H04N 19/11; H04N 19/593; H04N 19/52; H04N 19/136
See application file for complete search history.

(56) References Cited

U.S. PATENT DOCUMENTS 9,716,894 B2 7/2017 Joshi et al.
9,736,480 B2 8/2017 Lee et al.
10,021,384 B2 7/2018 Seregin et al.
11,032,550 B2 6/2021 Ye et al.
2006/0262983 A1 11/2006 Cheng et al.
2009/0226106 A1 9/2009 Choi et al.
2010/0118943 A1 5/2010 Shiodera et al.
2010/0172582 A1 7/2010 Ding
2011/0188572 A1 8/2011 Min et al.
2012/0014439 A1 1/2012 Segall et al.
2012/0106646 A1 5/2012 Cammas
2012/0269274 A1 10/2012 Kim
2012/0287989 A1 11/2012 Budagavi et al.
2013/0136175 A1 5/2013 Wang et al.
2013/0136179 A1 5/2013 Lim
2013/0287116 A1 10/2013 Helle
2013/0329794 A1 12/2013 Jeon et al.
2014/0286400 A1 9/2014 Joshi et al.
2015/0163494 A1 6/2015 Park et al.
2015/0189269 A1 7/2015 Han
2015/0281687 A1 10/2015 Yasugi et al.
2015/0365692 A1 12/2015 Liu et al.
2016/0050422 A1 2/2016 Rosewarne et al.
2016/0277738 A1 9/2016 Puri
2016/0373770 A1* 12/2016 Zhao .................... H04N 19/593
2017/0025121 A1 1/2017 Tang
2017/0251213 A1 8/2017 Ye et al.
2017/0264904 A1 9/2017 Koval et al.
2017/0272745 A1 9/2017 Liu et al.
2017/0272750 A1 9/2017 An
2018/0035123 A1 2/2018 Wennersten et al.
2018/0098074 A1 4/2018 Heo et al.
2020/0162729 A1* 5/2020 Lee ........................ H04N 19/46
2022/0311999 A1* 9/2022 Lee ...................... H04N 19/593
2024/0114148 A1* 4/2024 Jeon ..................... H04N 19/159
2026/0006208 A1* 1/2026 Kim ..................... H04N 19/137

FOREIGN PATENT DOCUMENTS

CN 103119945 A 5/2013
CN 103931190 A 7/2014
CN 104081774 A 10/2014
CN 104137549 A 11/2014
CN 104322064 A 1/2015
CN 104737542 A 6/2015
CN 104811718 A 7/2015
JP 2014-131162 A 7/2014
KR 1020120082375 A 7/2012
KR 10-1426272 B1 8/2014
KR 20140140658 A 12/2014
KR 10-2015-0022299 A 3/2015
KR 10-2015-0052818 A 5/2015
KR 2015-0056811 A 5/2015
KR 20150070849 A 6/2015
KR 20150095604 A 8/2015
KR 10-2015-0105348 A 9/2015
KR 10-1564563 B1 10/2015
KR 10-2443958 B1 11/2017
WO 2012011714 A2 1/2012
WO 2012120876 A1 9/2012
WO 2013069530 A1 5/2013
WO 2014/084671 A2 6/2014

OTHER PUBLICATIONS

Notice of Allowance dated Feb. 22, 2024 for corresponding Korean Patent Application No. 10-2016-0029699.
Office Action dated Jun. 25, 2024 for the corresponding Indian Patent Application No. 202218039116.
Office Action dated Jun. 28, 2024 for the corresponding Indian Patent Application No. 202218039115.
Seung-Hwan Kim et al., "Further improvement of intra coding tools", Joint Video Exploration Team(JVET) of ITU-T SG 16 WP 3 and ISO/IEC, JTC 1/SC 29/WG 11 ; 2nd Meeting: San Diego, USA, Feb. 20-26, 2016, JVET-B0051.
Shunsuke Iwamura et al., "Direction-dependent sub-TU scan order on intra prediction", Joint Video Exploration Team (JVET) of ITU-T SG 16 WP 3 and ISO/IEC, JTC 1/SC 29/WG 11 ; 2nd Meeting: San Diego, USA, Feb. 20-26, 2016, JVET-B0028.
Office Action dated Jul. 21, 2025 for the corresponding Chinese Patent Application No. 202310522574.4.
Office Action dated Jul. 26, 2025 for the corresponding Chinese Patent Application No. 202310522570.6.
Office Action dated Jul. 19, 2025 for the corresponding Chinese Patent Application No. 202310522554.7.
Office Action dated Jul. 22, 2025 for the corresponding Chinese Patent Application No. 202310522559.X.
Office Action dated Jul. 25, 2025 for the corresponding Chinese Patent Application No. 202310522560.2.

* cited by examiner

Final global motion compensation region determination flag = 0

Final global motion compensation region determination flag = 1

| seq_parameter_set_rbsp(){ | Descriptor |
|---|---|
| sps_video_parameter_set_id | u(4) |
| ... | |
| seq_model_intra_enabled_flag | u(1) |
| ... | |
| } | |

| pic_parameter_set_rbsp(){ | Descriptor |
|---|---|
| pps_pic_parameter_set_id | u(4) |
| ... | |
| if(seq_medel_intra_enabled_flag) | |
| 1002-4 pic_model_intra_enabled_flag | u(1) |
| ... | |
| if(pic_model_intra_enabled_flag) | |
| 1003-4 pic_model_intra_all_blk_sizes_flag | u(1) |
| ... | |
| if(pic_model_intra_enabled_flag &&!pic_model_intra_all_blk_siz_flag){ | |
| 1004-4 min_log2_model_intra_blk_size | ue(v) |
| 1005-4 max_log2_model_intra_blk_size | ue(v) |
| } | |
| ... | |
| } | |

| slice_segment_header(){ | Descriptor |
| --- | --- |
| first_slice_segment_in_pic_flag | u(1) |
| ... | |
| if(pic_model_intra_enabled_flag) | |
| slice_model_intra_enabed_flag | u(1) |
| ... | |
| } | |

VIDEO CODING METHOD AND APPARATUS

CROSS-REFERENCE TO RELATED APPLICATIONS

This application is a continuation of application Ser. No. 18/381,715 filed Oct. 19, 2023 which is a continuation of application Ser. No. 17/872,577 filed Jul. 25, 2022 which is a continuation of application Ser. No. 16/881,786 filed on May 22, 2020 which is a continuation of application Ser. No. 16/084,105 filed on Sep. 11, 2018, which is a national stage filing under 35 U.S.C § 371 of PCT application number PCT/KR2017/002578 filed on Mar. 9, 2017 which is based upon and claims the benefit of priority to Korean Patent Application Nos. 10-2016-0029699 filed on Mar. 11, 2016, 10-2016-0031800 filed on Mar. 17, 2016, 10-2016-0038075 filed on Mar. 30, 2016, 10-2016-0048883 filed on Apr. 21, 2016, and 10-2016-0054609 filed on May 3, 2016 in the Korean Intellectual Property Office, the entire disclosures of which are incorporated herein by reference for all purposes.

TECHNICAL FIELD

The present invention relates to image processing technology.

BACKGROUND ART

Recently, as demands for high-resolution and high-quality video have increased, high-efficiency video compression technology for next-generation video services is necessary.

In the video compression technology, quantization coefficient encoding and decoding technologies mean technology of generating a bitstream through entropy encoding technology performed on a signal subjected to transform and quantization with respect to a difference signal between an original signal and a prediction signal or technology of reconstructing the generated bitstream into the difference signal through entropy decoding technology.

DISCLOSURE

Technical Problem

An object of the present invention is to provide a method and apparatus for enhancing encoding efficiency in association with video compression technology.

Another object of the present invention is to provide a method and apparatus in which a decoder derives information on a motion vector and this enables video encoding/decoding to be performed effectively in such a manner that a video encoder/decoder for high-resolution images such as full-high-definition (FHD) images and ultra-high-definition (UHD) images effectively transmits motion information.

Another object of an embodiment of the present invention is to provide a method and apparatus for performing global motion compensation on an extensive region in an image.

Another object of an embodiment of the present invention is to provide a method and apparatus for generating a reference signal to effectively perform intra prediction.

Another object of an embodiment of the present invention is to provide a method and apparatus using a curve intra prediction technique in the video compression technology.

However, it is to be understood that technical problems to be solved by the present disclosure are not limited to the aforementioned technical problems and other technical problems may be present.

Technical Solution

In order to accomplish the above objects, according to an embodiment of the present invention, a video decoding apparatus and method include: a quantization coefficient group information obtainment module obtaining information on a quantization coefficient group for inverse quantization; a quantization coefficient group entropy decoding module obtaining quantization coefficients through entropy decoding on the quantization coefficient group; an inverse quantization module obtaining transform coefficients through inverse quantization on the obtained quantization coefficients; and an inverse transform module obtaining difference signals through an inverse transform process on the obtained transform coefficients.

In order to accomplish the above objects, according to an embodiment of the present invention, a video decoding apparatus and method include: a variably-sized quantization coefficient group usage extraction module extracting information on whether a variably-sized quantization coefficient group is used with respect to a current decoding bitstream, from the bitstream; a quantization coefficient group partition information decoding module obtaining partition information on the quantization coefficient group for inverse quantization in a current decoding unit when the extracted information on whether the variably-sized quantization coefficient group is used indicates that the variably-sized quantization coefficient group is used; and a quantization coefficient entropy decoding module performing quantization coefficient entropy decoding.

In order to accomplish the above objects, according to an embodiment of the present invention, a video decoding apparatus and method include: a quantization coefficient group partition flag extraction module extracting a quantization coefficient group partition flag with respect to partition from a bitstream on the basis of a size of a current decoding unit; a quantization coefficient group size determination module determining a size of the quantization coefficient group in the current decoding unit when the extracted quantization coefficient group partition flag indicates non-partition; a sub quantization coefficient group partition module partitioning the current decoding unit into multiple sub quantization coefficient groups when the extracted quantization coefficient group partition flag indicates partition; and a quantization coefficient group entropy decoding module performing quantization coefficient group entropy decoding.

In order to accomplish the above objects, according to an embodiment of the present invention, a video decoding apparatus and method include: a variably-sized quantization coefficient group usage extraction module extracting information on whether a variably-sized quantization coefficient group is used with respect to a current decoding bitstream, from the bitstream; a quantization coefficient group partition method determination module determining a method of partitioning the variably-sized quantization coefficient group when the extracted information on whether the variably-sized quantization coefficient group is used indicates that the variably-sized quantization coefficient group is used; and a quantization coefficient group size information obtainment module obtaining information on a size of the quantization coefficient group for inverse quantization in a current decoding unit according to the determined method of partitioning the variably-sized quantization coefficient group.

In order to accomplish the above objects, according to an embodiment of the present invention, a video decoding apparatus and method include: a quantization coefficient group partition number information extraction module extracting quantization coefficient group partition number information with respect to partition from a bitstream on the basis of a size of a current decoding unit; and a quantization coefficient group partition module partitioning a quantization coefficient group using partition information defined on the basis of a method of partitioning a variably-sized quantization coefficient group, the size of the current decoding unit, and the quantization coefficient group partition number information.

In order to accomplish the above objects, according to an embodiment of the present invention, a video decoding apparatus and method include: a variably-sized quantization coefficient group usage information extraction module extracting information on whether a variably-sized quantization coefficient group is used with respect to a current decoding bitstream, from the bitstream; a quantization group partition information obtainment module coefficient obtaining partition information of the quantization coefficient group for inverse quantization in a current decoding unit when the extracted information on whether the variably-sized quantization coefficient group is used indicates that the variably-sized quantization coefficient group is used; and an entropy decoding scanning order obtainment module obtaining an entropy decoding scanning order of the quantization coefficient group on the basis of partition information on the quantization coefficient group for inverse quantization.

In order to accomplish the above objects, according to an embodiment of the present invention, the video decoding apparatus and method include a motion information derivation unit or step, and a decoder may derive motion information without information on a motion vector directly received from an encoder.

As technical means for achieving the above objects, according to an embodiment of the present invention, an image decoding apparatus and method include: obtaining information for global motion compensation from a bitstream; determining a global motion compensation region using the information for global motion compensation; and performing global motion compensation on the determined global motion compensation region.

As technical means for achieving the above objects, according to an embodiment of the present invention, an image decoding apparatus and method include: extracting a flag indicating whether global motion compensation is used from a bitstream; determining a global motion compensation region from the bitstream when the extracted flag indicates use of global motion compensation; and extracting information for performing motion compensation on each determined global motion region.

As technical means for achieving the above objects, according to an embodiment of the present invention, an image decoding apparatus and method include: extracting a flag indicating whether global motion compensation is used from a bitstream; and performing motion compensation on a per-coding block basis when the extracted flag indicates non-use of global motion compensation.

As technical means for achieving the above objects, according to an embodiment of the present invention, an image decoding apparatus and method include: determining a region subjected to global motion compensation using motion compensation region determination information obtained from a bitstream; and performing motion compensation on each determined region subjected to motion compensation.

As technical means for achieving the above objects, according to an embodiment of the present invention, an image decoding apparatus and method include: performing global motion compensation on each global motion compensation region using performance information for each motion compensation region obtained from a bitstream.

As technical means for achieving the above technical objects, according to an embodiment of the present invention, in performing intra prediction, an image decoding method and apparatus may generate a signal on an unreconstructed region using a neighboring reconstruction signal referenced for intra prediction such that effective intra prediction is performed. Also, a range to be referenced for intra prediction in a reconstructed signal is expanded compared with a conventional range such that many more reconstruction pixels are referenced. Accordingly, intra prediction performance is enhanced.

As technical means for achieving the above objects, according to an embodiment of the present invention, an image decoding apparatus and method include: extracting information for generating a prediction signal from a bitstream; performing reference sample padding using the extracted information; generating a prediction sample by performing curve intra prediction using the extracted information; and performing filtering on the generated prediction sample.

As technical means for achieving the above objects, according to an embodiment of the present invention, an image decoding apparatus and method include: obtaining information for generating a prediction signal from a bitstream; and extracting information on curve intra prediction from the bitstream when the extracted intra prediction mode information indicates curve intra prediction.

As technical means for achieving the above objects, according to an embodiment of the present invention, an image decoding apparatus and method include: determining whether to perform reference sample padding using information on curve intra prediction obtained from a bitstream and information on whether a reference sample of a neighboring block is present; and performing reference sample padding.

As technical means for achieving the above objects, according to an embodiment of the present invention, an image decoding apparatus and method include generating a prediction sample using information on curve intra prediction obtained from a bitstream.

As technical means for achieving the above objects, according to an embodiment of the present invention, an image decoding apparatus and method include performing filtering using a variation in a neighboring reference sample when with respect to a left prediction sample column and a top prediction sample row of a generated prediction block, a region containing the sample column is subjected to horizontal direction prediction or vertical direction prediction.

Advantageous Effects

The present invention is intended to provide a method and apparatus that use a quantization coefficient group that is in variable size depending on the characteristics of a signal and use an encoding and decoding order corresponding thereto, whereby quantization coefficient encoding efficiency is enhanced.

According to the embodiment of the present invention, the variably-sized quantization coefficient group and selective coefficient encoding and decoding order are used to increase the number of coefficients excluded from encoding, whereby performance of quantization coefficient encoding is enhanced.

Also, according to the embodiment of the present invention, the quantization coefficient group varies in size and shape so that an energy concentration effect by transform and quantization and a high frequency component removal effect are obtained, whereby performance of coefficient encoding is enhanced.

According to the above-described technical solution of the present invention, in the decoder, a motion information derivation unit or step enables video decoding without direct transmission of a motion vector, whereby video encoding/decoding efficiency is enhanced.

The present invention is intended to propose a method and apparatus for performing global motion compensation on an extensive region in a motion compensation process used in a conventional video compression technology so as to enhance encoding efficiency.

According to an embodiment of the present invention, motion compensation is performed on an extensive region at once, and information on a global motion compensation region is effectively transmitted to the decoder, thereby enhancing encoding performance.

According to the above-described technical solution of the present invention, the decoder generates the intra prediction signal and expands a reference range so that intra prediction performance is enhanced, whereby overall performance of video compression performance is enhanced.

The present invention is intended to propose a method and apparatus for performing curve intra prediction in an intra prediction process used in the conventional video compression technology so as to enhance encoding/decoding efficiency.

According to the above-described technical solution of the present invention, curve intra prediction enhances intra prediction efficiency in the encoder/decoder so that video compression performance is enhanced.

DESCRIPTION OF DRAWINGS

FIG. 37 is a diagram illustrating a method of signaling whether intra prediction is performed which is proposed by a sequence parameter set of a high-level syntax for an intra prediction method according to an embodiment of the present invention.

FIG. 38 is a diagram illustrating a method of signaling whether intra prediction is performed which is proposed by a picture parameter set of a high-level syntax for an intra prediction method according to an embodiment of the present invention.

FIG. 39 is a diagram illustrating a method of signaling whether intra prediction is performed which is proposed by a slice segment header of a high-level syntax for an intra prediction method according to an embodiment of the present invention.

BEST MODE

Figure 1:
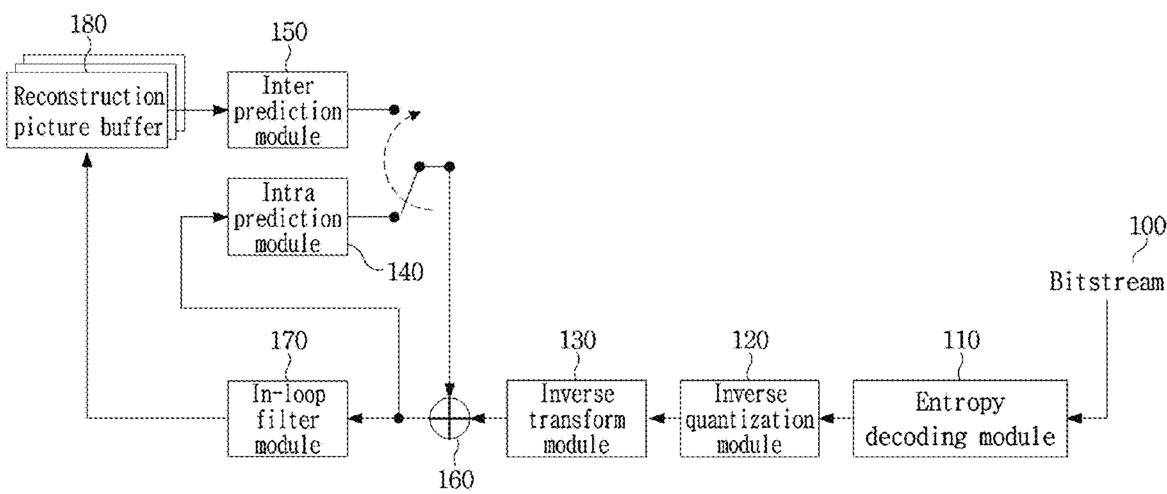
FIG. 1 is a block diagram illustrating configuration of a video decoding apparatus according to an embodiment of the present invention.

In order to accomplish the above objects, according to an embodiment of the present invention, a video decoding apparatus and method include: a quantization coefficient group information obtainment module obtaining information on a quantization coefficient group for inverse quantization; a quantization coefficient group entropy decoding module obtaining quantization coefficients through entropy decoding on the quantization coefficient group; an inverse quantization module obtaining transform coefficients through inverse quantization on the obtained quantization coefficients; and an inverse transform module obtaining difference signals through an inverse transform process on the obtained transform coefficients.

In order t accomplish the above objects, according to an embodiment of the present invention, a video decoding apparatus and method include: a variably-sized quantization coefficient group usage extraction module extracting information on whether a variably-sized quantization coefficient group is used with respect to a current decoding bitstream, from the bitstream; a quantization coefficient group partition information decoding module obtaining partition information on the quantization coefficient group for inverse quantization in a current decoding unit when the extracted information on whether the variably-sized quantization coefficient group is used indicates that the variably-sized quantization coefficient group is used; and a quantization coefficient entropy decoding module performing quantization coefficient entropy decoding.

In order to accomplish the above objects, according to an embodiment of the present invention, a video decoding apparatus and method include: a quantization coefficient group partition flag extraction module extracting a quantization coefficient group partition flag with respect to partition from a bitstream on the basis of a size of a current decoding unit; a quantization coefficient group size determination module determining a size of the quantization coefficient group in the current decoding unit when the extracted quantization coefficient group partition flag indicates non-partition; a sub quantization coefficient group partition module partitioning the current decoding unit into multiple sub quantization coefficient groups when the extracted quantization coefficient group partition flag indicates partition; and a quantization coefficient group entropy decoding module performing quantization coefficient group entropy decoding.

In order to accomplish the above objects, according to an embodiment of the present invention, a video decoding apparatus and method include: a variably-sized quantization coefficient group usage extraction module extracting information on whether a variably-sized quantization coefficient group is used with respect to a current decoding bitstream, from the bitstream; a quantization coefficient group partition method determination module determining a method of partitioning the variably-sized quantization coefficient group when the extracted information on whether the variably-sized quantization coefficient group is used indicates that the variably-sized quantization coefficient group is used; and a quantization coefficient group size information obtainment module obtaining information on a size of the quantization coefficient group for inverse quantization in a current decoding unit according to the determined method of partitioning the variably-sized quantization coefficient group.

In order to accomplish the above objects, according to an embodiment of the present invention, a video decoding apparatus and method include: a quantization coefficient group partition number information extraction module extracting quantization coefficient group partition number information with respect to partition from a bitstream on the basis of a size of a current decoding unit; and a quantization coefficient group partition module partitioning a quantization coefficient group using partition information defined on the basis of a method of partitioning a variably-sized quantization coefficient group, the size of the current decoding unit, and the quantization coefficient group partition number information.

In order to accomplish the above objects, according to an embodiment of the present invention, a video decoding apparatus and method include: a variably-sized quantization coefficient group usage information extraction module extracting information on whether a variably-sized quantization coefficient group is used with respect to a current decoding bitstream, from the bitstream; a quantization coefficient group partition information obtainment module of the quantization obtaining partition information coefficient group for inverse quantization in a current decoding unit when the extracted information on whether the variably-sized quantization coefficient group is used indicates that the variably-sized quantization coefficient group is used; and an entropy decoding scanning order obtainment module obtaining an entropy decoding scanning order of the quantization coefficient group on the basis of partition information on the quantization coefficient group for inverse quantization.

In order to accomplish the above objects, according to an embodiment of the present invention, the video decoding apparatus and method include a motion information derivation unit or step, and a decoder may derive motion information without information on a motion vector directly received from an encoder.

As technical means for achieving the above objects, according to an embodiment of the present invention, an image decoding apparatus and method include: obtaining information for global motion compensation from a bitstream; determining a global motion compensation region using the information for global motion compensation; and performing global motion compensation on the determined global motion compensation region.

As technical means for achieving the above objects, according to an embodiment of the present invention, an image decoding apparatus and method include: extracting a flag indicating whether global motion compensation is used from a bitstream; determining a global motion compensation region from the bitstream when the extracted flag indicates use of global motion compensation; and extracting information for performing motion compensation on each determined global motion region.

As technical means for achieving the above objects, according to an embodiment of the present invention, an image decoding apparatus and method include: extracting a flag indicating whether global motion compensation is used from a bitstream; and performing motion compensation on a per-coding block basis when the extracted flag indicates non-use of global motion compensation.

As technical means for achieving the above objects, according to an embodiment of the present invention, an image decoding apparatus and method include: determining a region subjected to global motion compensation using motion compensation region determination information obtained from a bitstream; and performing motion compensation on each determined region subjected to motion compensation.

As technical means for achieving the above objects, according to an embodiment of the present invention, an image decoding apparatus and method include: performing global motion compensation on each global motion compensation region using performance information for each motion compensation region obtained from a bitstream.

As technical means for achieving the above technical objects, according to an embodiment of the present invention, in performing intra prediction, an image decoding method and apparatus a may generate signal on an unreconstructed region using a neighboring reconstruction signal referenced for intra prediction such that effective intra prediction is performed. Also, a range to be referenced for intra prediction in a reconstructed signal is expanded compared with a conventional range such that much more reconstruction pixels are referenced, thereby intra prediction performance is enhanced.

As technical means for achieving the above objects, according to an embodiment of the present invention, an image decoding apparatus and method include: extracting information for generating a prediction signal from a bitstream; performing reference sample padding using the extracted information; generating a prediction sample by performing curve intra prediction using the extracted information; and performing filtering on the generated prediction sample.

As technical means for achieving the above objects, according to an embodiment of the present invention, an image decoding apparatus and method include: obtaining information for generating a prediction signal from a bitstream; and extracting information on curve intra prediction from the bitstream when the extracted intra prediction mode information indicates curve intra prediction.

As technical means for achieving the above objects, according to an embodiment of the present invention, an image decoding apparatus and method include: determining whether to perform reference sample padding using information on curve intra prediction obtained from a bitstream and information on whether a reference sample of a neighboring block is present; and performing reference sample padding.

As technical means for achieving the above objects, according to an embodiment of the present invention, an image decoding apparatus and method include generating a prediction sample using information on curve intra prediction obtained from a bitstream.

As technical means for achieving the above objects, according to an embodiment of the present invention, an image decoding apparatus and method include performing filtering using a variation in a neighboring reference sample when with respect to a left prediction sample column and a top prediction sample row of a generated prediction block, a region containing the sample column is subjected to horizontal direction prediction or vertical direction prediction.

MODE FOR INVENTION

Hereinbelow, exemplary embodiments of the present disclosure will be described in detail with reference to the accompanying drawings such that the invention can be easily embodied by those skilled in the art to which this invention belongs. However, the present invention may be embodied in various different forms and should not be limited to the embodiments set forth herein. In order to clearly describe the present invention, parts not related to the description are omitted in the accompanying drawings, and similar elements are denoted by similar reference numerals throughout the description.

Throughout the description, when a part is referred to as being connected to another part, it includes not only being directly connected, but also being electrically connected by interposing the other part therebetween.

Also, throughout the description, it should also be understood that when a component includes an element, unless there is another opposite description thereto, the component does not exclude another element but may further include the other element.

Throughout the description, the term step of does not mean step for.

Also, it should also be understood that, although the terms first, second, etc. may be used herein to describe various elements, these elements should not be limited by these terms. These terms are only used to distinguish one element from another element.

Moreover, constituent parts described in the embodiments of the present invention are independently shown so as to represent characteristic features different from each other. Thus, it does not mean that each constituent part is constituted in a constitutional unit of separated hardware or software. That is, each constituent part includes each of enumerated constituent parts for convenience. Thus, at least two constituent parts of each constituent part may be combined to form one constituent part or one constituent part may be divided into a plurality of constituent parts to perform each function. The embodiment where each constituent part is combined and the embodiment where one constituent part is divided are also included in the scope of the present invention, if not departing from the essence of the present invention.

Also, some of elements are not indispensable elements which perform essential functions in the present invention but optional elements for just enhancing the performance thereof. The present invention may be implemented by including only the indispensable constituent parts for implementing the essence of the present invention except the elements used in improving performance. The structure including only the indispensable elements except the optional elements used in improving only performance is also included in the scope of the present invention.

A block used in the present invention may be a basic block unit, a prediction block unit, and a transform block unit in decoding. Also, a block boundary may be a boundary of a decoding block, a boundary of a prediction block, and a boundary of a transform block.

First, terms used in the present application are briefly described as follows.

Hereinafter, a video decoding apparatus may be an apparatus included in a personal computer (PC), a notebook computer, a portable multimedia player (PMP), a wireless communication terminal, a smart phone, and a server terminal such as a TV application server, a service server, and the like. Also, the video decoding apparatus may mean an apparatus, which may be provided in various types, including: various devices, such as a user terminal, and the like; a communication device, and the like, such as a communication modem for performing communication via a wired/wireless communication network; a memory storing various programs and data for decoding an image or for inter or intra prediction to decode the image; and a microprocessor executing programs for calculation and control.

Also, the encoded image in bitstreams by an encoder may be transmitted to an image decoding apparatus in real-time or not in real-time via the wired/wireless communication network, such as the Internet, a wireless local area network, a WiBro network, a mobile network, and the like, or via various communication interfaces, such as a cable, a universal serial bus (USB), and the like, and the encoded image may be decoded and reconstructed into an image for display.

In general, a video may be composed of a series of pictures, and each picture may be partitioned into coding units such as blocks. Also, the term a picture described below may be replaced with another term an image, a frame, or the like having the same meaning, which may be understood by those skilled in the art to which the embodiments belong.

Global motion compensation means a method of performing motion compensation on an extensive region at once. A method of performing global motion compensation is referred to as a global motion compensation method, and a region on which global motion compensation is performed is referred to as a global motion compensation region.

Hereinafter, in various embodiments of the present invention described in the description, “a quantization coefficient group” refers to a unit of processing quantization transform coefficient which has been subjected to transform and quantization processes, and may inclusively refer to a group of transform signals subjected to only transform, a group of quantization signal subject to only the quantization process, and a group of signal not subjected to both transform and quantization.

Hereinafter, according to an embodiment of the present invention, a video decoding apparatus and method in which a variably-sized quantization coefficient group is included will be described in detail.

FIG. 1 is a block diagram illustrating configuration of a video decoding apparatus and method according to an embodiment of the present invention.

According to an embodiment of the present invention, the video decoding apparatus and method may include at least one of an entropy decoding module 110, an inverse quantization module 120, an inverse transform module 130, an intra prediction module 140, an inter prediction module 150, an adder 160, an in-loop filter module 170, and a reconstruction picture buffer 180.

The entropy decoding module 110 decodes an input bitstream 100 so that decoding information, such as syntax elements, a quantized coefficient, and the like is output.

The inverse quantization module 120 and the inverse transform module 130 receive the quantization coefficient, perform inverse quantization and inverse transform in order, and a residual signal is output.

The intra prediction module 140 generates a prediction signal by performing spatial prediction using a pixel value of a pre-decoded neighboring block adjacent to a current decoding block.

The inter prediction module 150 generates a prediction signal by performing motion compensation using a motion vector extracted from the bitstream and a reconstruction image stored in the reconstruction picture buffer 180.

The prediction from signals output the intra prediction module 140 and the inter prediction module 150 are added to a residual signal by the adder 160, and thus a reconstruction signal generated on a per-block basis includes the reconstructed image.

The reconstructed image is transmitted to the in-loop filter module 170. A reconstruction picture to which filtering is applied is stored in the reconstruction picture buffer 180, and is used as a reference picture by the inter prediction module 150.

Figure 2:
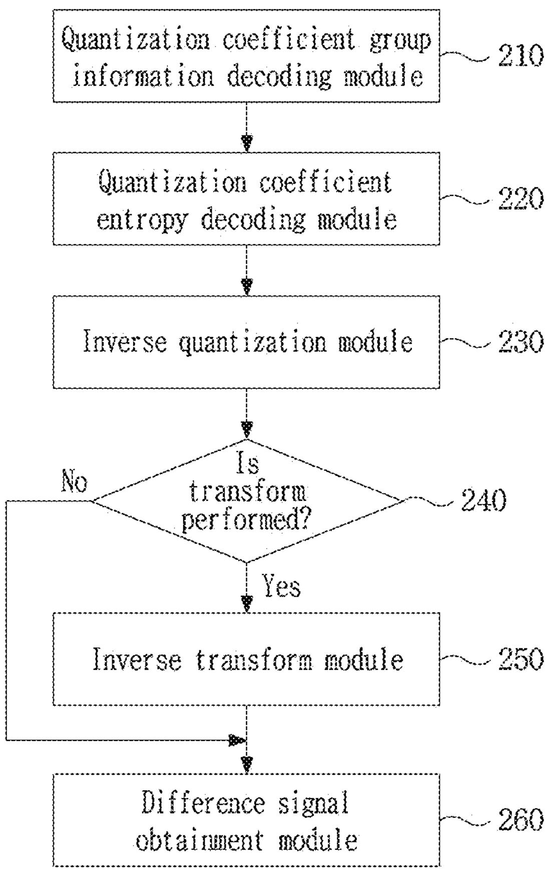
FIG. 2 is a block diagram illustrating a sequence of decoding a variably-sized quantization group according to an embodiment of the present invention.

FIG. 2 is a block diagram illustrating a sequence of decoding a variably-sized quantization group according to an embodiment of the present invention.

According to the embodiment of the video decoding apparatus and method, included is at least one of a quantization coefficient group information decoding module 210, a quantization coefficient entropy decoding module 220, an inverse quantization module 230, an inverse transform module 250, and a difference signal obtainment module 260.

The quantization coefficient group information decoding module 210 extracts information on the quantization coefficient group from the bitstream.

According to the embodiment, the information on the quantization coefficient group includes: whether the variably-sized quantization group is used and the size of the quantization coefficient group; or whether the variably-sized quantization group is used, the size of the quantization coefficient group, and the partition type of the quantization coefficient group. Also, according to the embodiment, the quantization coefficient group information may be included in a sequence parameter set, a picture parameter set, a slice header, or a decoding unit, and is transmitted through one or more of the above-described units. Also, according to the embodiment, the quantization coefficient group is expressed in a flag form, the minimum or maximum size of the quantization coefficient group, a depth type of available size according thereto, and the like. Here, the minimum or maximum size is expressed in log form. The quantization coefficient group information extracted from the bitstream by the quantization information decoding module 210 is coefficient group transmitted to the quantization coefficient entropy decoding module 220.

The quantization coefficient entropy decoding module 220 operates in a decoding unit, and decodes the encoded quantization coefficient from the bitstream.

According to the embodiment, entropy decoding of the quantization coefficients means extracting quantization coefficients which correspond to a current decoding quantization coefficient group, from the bitstream using the quantization coefficient group information extracted by the quantization coefficient group information decoding module 210. Also, according to the embodiment, when the quantization coefficients are extracted from the bitstream, an entropy decoding scanning order may use a pre-defined scanning order depending on current quantization coefficient group information, or the entropy decoding scanning order for the quantization coefficient group is transmitted as additional information.

The inverse quantization module 230 performs inverse quantization on the quantization coefficients extracted by the quantization coefficient entropy decoding module 220.

According to the embodiment, the inverse quantization module performs inverse quantization on the quantization coefficients extracted by the quantization coefficient entropy decoding module 220. However, when there is no extracted quantization coefficient and when determining that quantization is not performed, inverse quantization is not performed.

According to the embodiment, when whether transform is performed 240 is determined and determining that transform is performed, the signal extracted by the inverse quantization module 230 is provided to the inverse transform module 250 and the difference signal is obtained by the inverse transform module. In contrast, when whether transform is performed 240 is determined and determining that transform is not performed, the signal extracted by the inverse quantization 230 is directly used as the difference signal without going through the inverse transform module 250.

Figure 3:
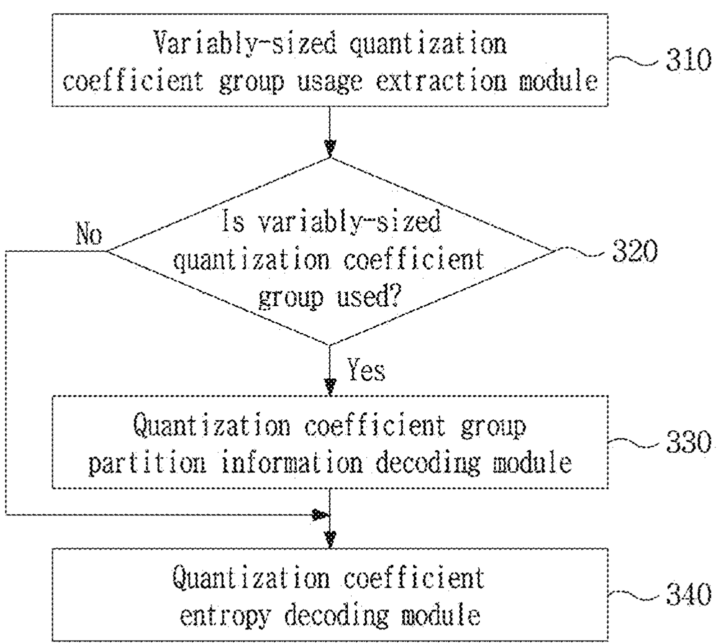
FIG. 3 is a block diagram illustrating a sequence of determining whether a variably-sized quantization coefficient group is decoded and obtaining quantization coefficient group partition information according to an embodiment of the present invention.

FIG. 3 is a block diagram illustrating a sequence of determining whether a variably-sized quantization coefficient group is decoded and obtaining quantization coefficient group partition information according to an embodiment of the present invention.

According to the embodiment of the video decoding apparatus and method, included is at least one of a variably-sized quantization coefficient group usage extraction module 310, a variably-sized quantization coefficient group usage determination module 320, a quantization coefficient group partition information decoding module 330, and a quantization coefficient entropy decoding module 340.

The variably-sized quantization coefficient group usage extraction module 310 extracts information on whether the variably-sized quantization coefficient group is used.

According to the embodiment, in decoding the quantization coefficient group, information on whether the variably-sized quantization coefficient group is used is information for determining whether the variably-sized quantization coefficient group proposed in the present invention is used. The information expresses the flag form or the used partition type of the variably-sized quantization coefficient group in the form of a particular value. Also, according to the embodiment, information on whether the variably-sized quantization coefficient group is used may be included in the sequence parameter set, the picture parameter set, the slice header, the decoding unit, or the quantization coefficient group, and is transmitted through one or more of the above-described units.

The variably-sized quantization coefficient group usage determination module 320 determines whether the variably-sized quantization coefficient group is used, which is extracted by the variably-sized quantization coefficient group usage extraction module 310.

The quantization coefficient group partition information decoding module 330 obtains quantization coefficient group partition information.

According to the embodiment, when determining that the variably-sized quantization coefficient group is used, the information of the variably-sized quantization coefficient group is extracted from the bitstream by the quantization coefficient group partition information decoding module 330.

According to the embodiment, the information on the quantization coefficient group may include: the size of the quantization coefficient group; or the size of the quantization coefficient group and the partition type of the quantization coefficient group. Also, according to the embodiment, the quantization coefficient group information may be included in the sequence parameter set, the picture parameter set, the slice header, the decoding unit, or the quantization coefficient group, and is transmitted through one or more of the above-described units. Also, according to the embodiment, the quantization coefficient group information is expressed in the flag form, the minimum or maximum size of the quantization coefficient group, the depth type of available size according thereto, and the like. Here, the minimum or maximum size is expressed in log form. The quantization coefficient group information extracted from the bitstream by the quantization coefficient group partition information decoding module 330 is transmitted to the quantization coefficient entropy decoding module 340.

The quantization coefficient entropy decoding module 340 operates in the decoding unit, and decodes the encoded quantization coefficient from the bitstream.

According to the embodiment, entropy decoding of the quantization coefficient means extracting the quantization coefficients which correspond to the current decoding quantization coefficient group, from the bitstream using the quantization coefficient group information extracted from the quantization coefficient group partition information decoding module 330. Also, according to the embodiment, when the quantization coefficients are extracted from the bitstream, the entropy decoding scanning order may use the pre-defined scanning order depending on current quantization coefficient group information, or the entropy decoding scanning order for the quantization coefficient group is transmitted as the additional information.

Figure 4:
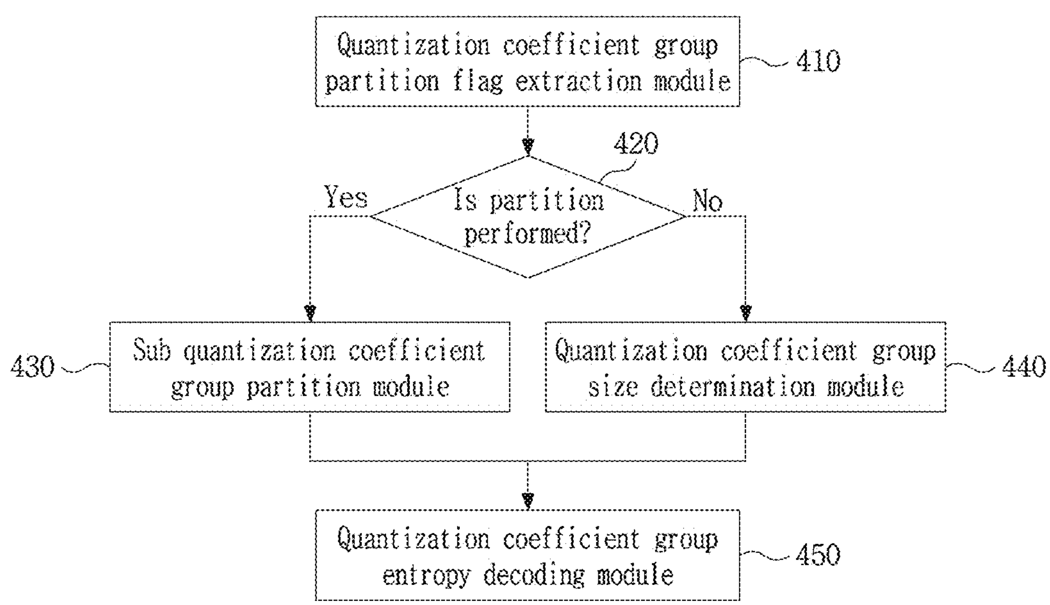
FIG. 4 is a block diagram illustrating a sequence of decoding using a variably-sized quantization group partition flag according to an embodiment of the present invention.

FIG. 4 is a block diagram illustrating a sequence of decoding using a variably-sized quantization group partition flag according to an embodiment of the present invention.

According to the embodiment of the video decoding apparatus and method, included is at least one of a quantization coefficient group partition flag extraction module 410, a partition determination module 420, a sub quantization coefficient group partition module 430, a quantization coefficient group size determination module 440, and a quantization coefficient group entropy decoding module 450.

The quantization coefficient group partition flag extraction module 410 extracts a flag on whether to partition a current quantization coefficient group, from the bitstream in using the variably-sized quantization coefficient in the quad-tree form.

According to the embodiment, the quantization coefficient group may be partitioned in the quad-tree form. The quantization coefficient group in a quad-tree partition structure may be a quantization coefficient group which is not partitioned or is partitioned in a recursive partition structure with one or more depths.

The partition determination module 420 determines whether to partition the current quantization coefficient group on the basis of the flag on whether to partition the quantization coefficient group, which is extracted by the quantization coefficient group partition flag extraction module 410.

According to the embodiment, when the quantization coefficient group is partitioned, the sub quantization coefficient group partition module 430 operates. Here, the quantization coefficient group partition flag extraction module 410 and the partition determination module 420 recursively operate.

According to the embodiment, when the quantization coefficient group is not partitioned, the quantization coefficient group size determination module 440 determines the size of the current block as the size of the quantization coefficient group, and the quantization coefficient group entropy decoding module 450 performs entropy decoding on the quantization coefficient group.

Figure 5:
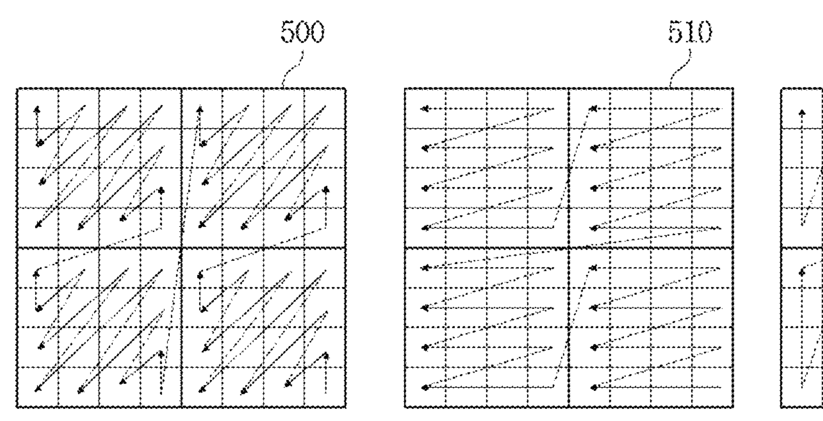
FIGS. 5 and 6 are schematic diagrams illustrating examples of quantization coefficient groups in a 4×4 fixed size and scanning orders for an 8×8 decoding block and a 16×16 decoding block using the groups.
Figure 5:
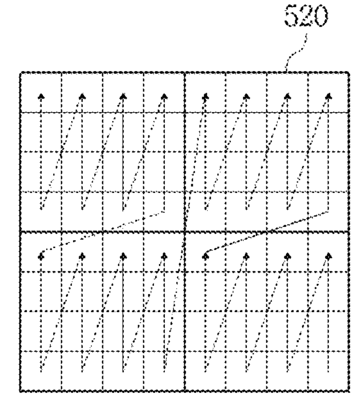
Figure 6:
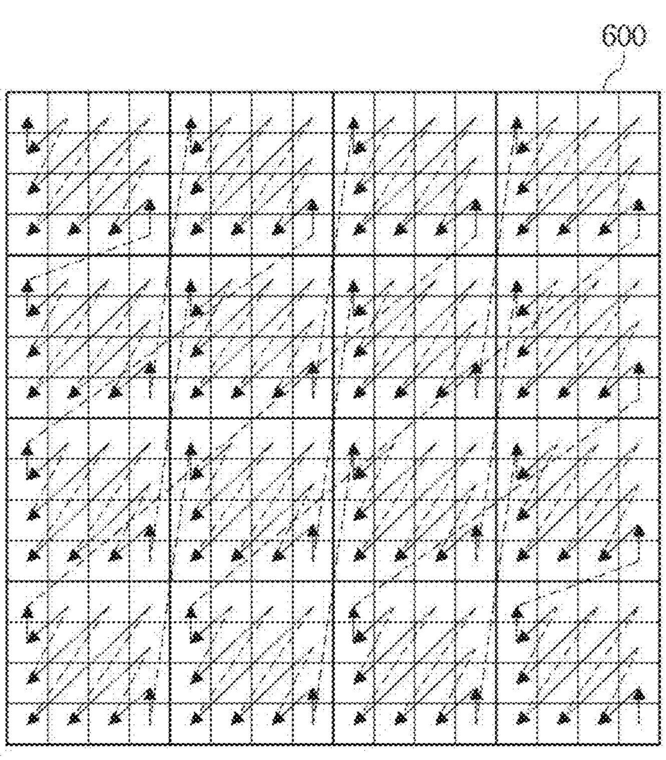

FIGS. 5 and 6 are schematic diagrams illustrating examples of quantization coefficient groups in 4×4 fixed sizes used in a conventional video decoding apparatus and method and scanning orders for an 8×8 decoding block and a 16×16 decoding block using the groups.

The quantization coefficient group in a 4×4 fixed size used in the conventional video decoding apparatus and method uses a scanning order including at least one of a zigzag scanning order 500 and 600, a horizontal direction scanning order 510, and a vertical direction scanning order 520.

Figure 7:
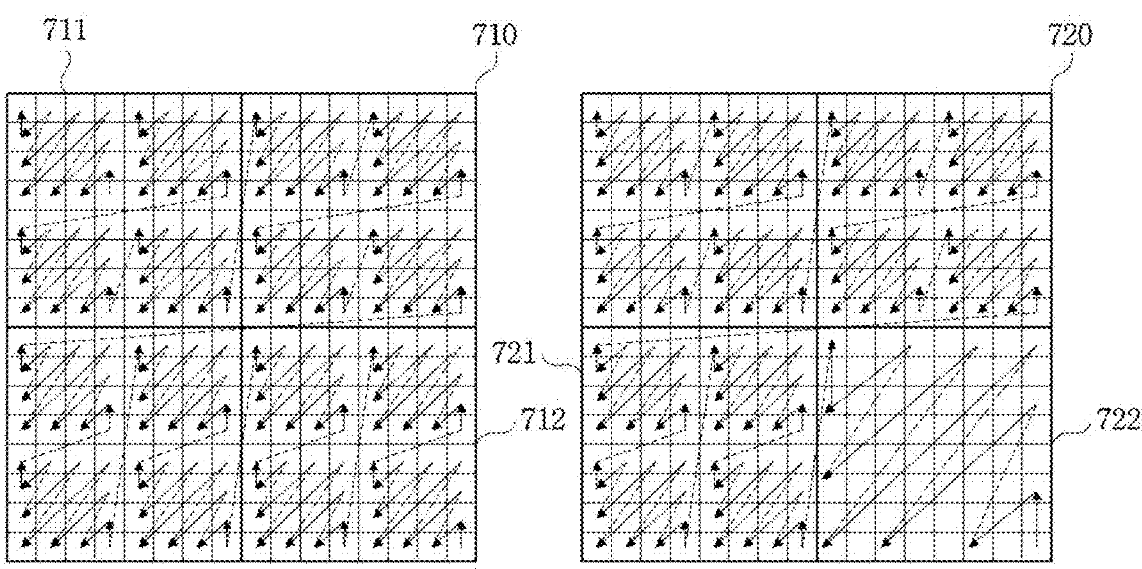
FIG. 7 is a schematic diagram illustrating examples of using a quad-tree configuration and multiple scanning orders with respect to a variably-sized quantization coefficient group according to an embodiment of the present invention.

FIG. 7 is a schematic diagram illustrating examples of using a quad-tree configuration and multiple scanning orders with respect to a variably-sized quantization coefficient group according to an embodiment of the present invention.

According to the embodiment, in the entropy decoding process of the variably-sized quantization coefficient group, the scanning orders used in the conventional video decoding apparatus and method described in FIGS. 5 and 6 are included. The same scanning order 710 is used in different quantization coefficient groups within the same decoding block, or different scanning orders 720 are used.

According to the embodiment, when the quantization coefficients are extracted from the bitstream, the entropy decoding scanning order may use the pre-defined scanning order depending on the current quantization group information, or the entropy decoding scanning order for the quantization coefficient group is transmitted as the additional information.

Figure 8:
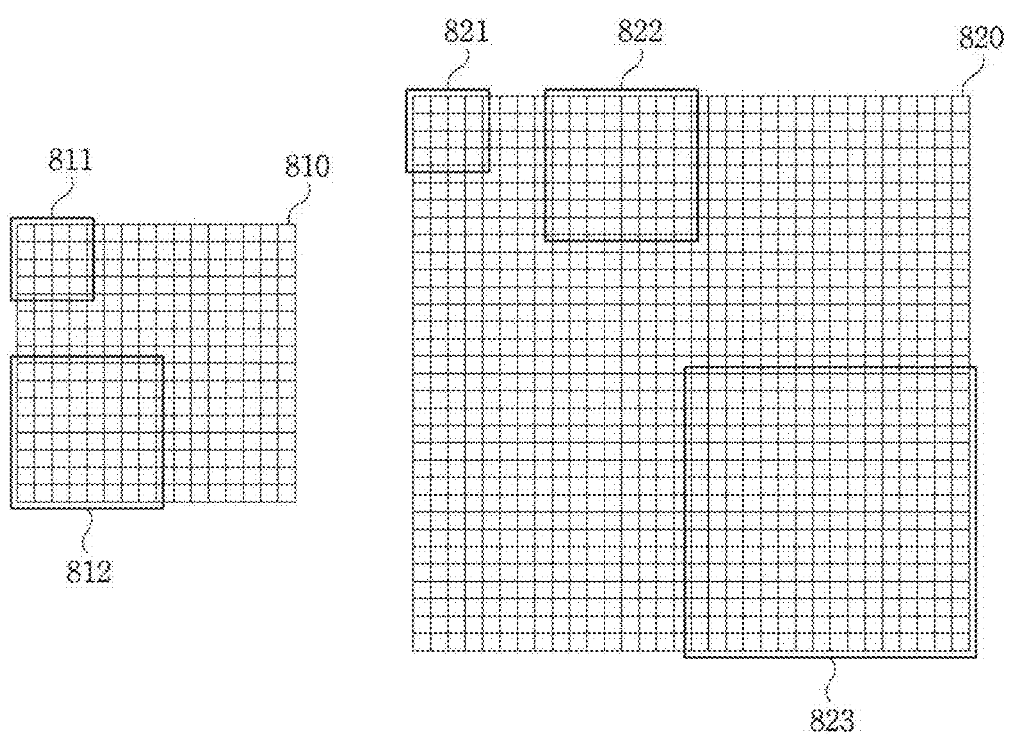
FIG. 8 is a schematic diagram illustrating examples of quad-tree partition of a 16×16 decoding block and a 32×32 decoding block for a variably-sized quantization coefficient group according to an embodiment of the present invention.

FIG. 8 is a schematic diagram illustrating examples of quad-tree partition of a 16×16 decoding block and a 32×32 decoding block for a variably-sized quantization coefficient group according to an embodiment of the present invention.

According to the embodiment of the video decoding apparatus and method, included is quantization coefficient entropy decoding using decoding blocks 810 and 820 that have quantization coefficient groups quad-tree partitioned.

According to the embodiment, the video decoding apparatus and method include an apparatus and method of using decoding blocks 810 and 820 which have quantization coefficient groups quad-tree partitioned and an apparatus and method of recursively partitioning quantization coefficient group according to quad-tree partition depth information. The 16×16 decoding block 810 is an example in which a 4×4 quantization coefficient group 811 and an 8×8 quantization coefficient group 812 are used according to quad-tree partitioning. The 32×32 decoding block 820 is an example in which a 4×4 quantization coefficient group 821, an 8×8 quantization coefficient group 822, and a 16×16 quantization coefficient group 823 are used according to quad-tree partitioning.

Figure 9:
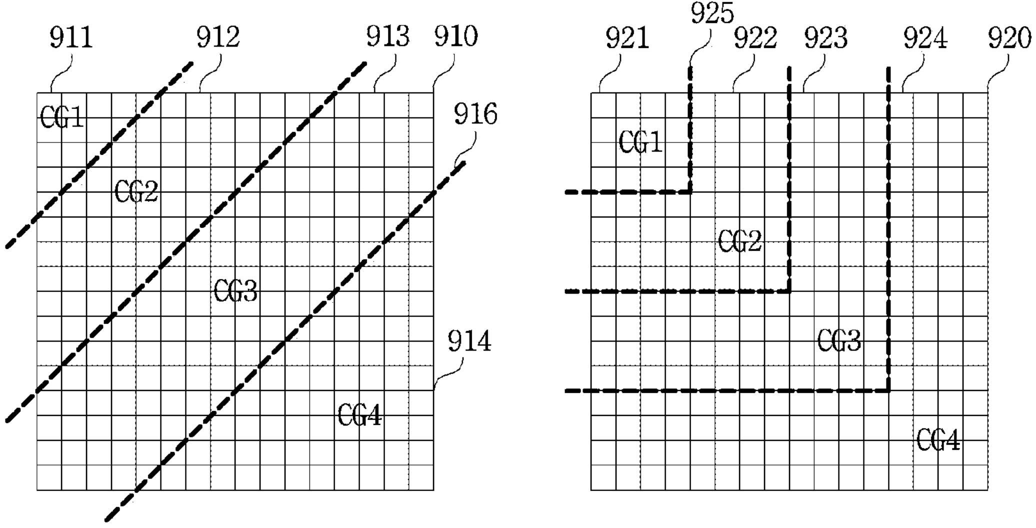
FIG. 9 is a schematic diagram illustrating examples of partitioning a variably-sized quantization coefficient group depending on input signal characteristics except for a square shape according to an embodiment of the present invention.

FIG. 9 is a schematic diagram illustrating examples of partitioning a variably-sized quantization coefficient group depending on input signal characteristics except for a square shape according to an embodiment of the present invention.

According to the embodiment of the video decoding apparatus and method, included are quantization coefficient group partition 910 using diagonals and L-shaped quantization coefficient group partition 920.

In FIG. 9, quantization coefficient group partition 910 using diagonals is an example of partitioning into a low frequency quantization coefficient group 1 911, a low frequency quantization coefficient group 2 912, a high frequency quantization coefficient group 1 913, and a high frequency quantization coefficient group 2 914.

According to the embodiment, quantization coefficient group partition 910 using diagonals enables quantization coefficient group partition using the diagonal 916 with respect to from a low frequency region to a high frequency region depending on the characteristics of the input signal. According to the embodiment, the number of times of partitioning in quantization coefficient group partition 910 using diagonals uses a fixed number or the number of times of partitioning varies by extraction from the bitstream.

In FIG. 9, L-shaped quantization coefficient group partition 920 is an example of partitioning into a low frequency quantization coefficient group 1 921, a low frequency quantization coefficient group 2 922, a high frequency quantization coefficient group 1 923, and a high frequency quantization coefficient group 2 924.

According to the embodiment, L-shaped quantization coefficient group partition 920 enables quantization coefficient group partition using an L-shaped line 925 with respect to from the low frequency region to the high frequency region depending on the characteristics of the input signal. According to the embodiment, the number of times of partitioning in L-shaped quantization coefficient group partition 920 is a fixed number or the number of times of partitioning varies by extraction from the bitstream.

Figure 10:
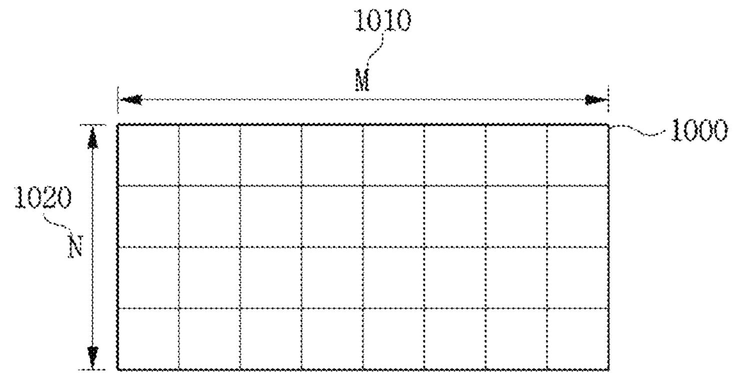
FIG. 10 is a schematic diagram illustrating a variably-sized quantization coefficient group in a non-square shape according to an embodiment of the present invention.

FIG. 10 is a schematic diagram illustrating a variably-sized quantization coefficient group in a non-square shape according to an embodiment of the present invention.

According to the embodiment of the video decoding apparatus and method, a variably-sized quantization coefficient group 1010 in a non-square shape includes at least one of non-square-shaped horizontal length information 1010 and vertical length information 1020. The non-square-shaped horizontal length information and vertical length information are derived using partition information in a high-level quantization coefficient group in a square shape, and the non-square-shaped horizontal length information and vertical length information are extracted from the bitstream. According to the embodiment, when using the non-square-shaped horizontal length information and vertical length information extracted from the bitstream, included is derivation based on values corresponding to the non-square-shaped horizontal length information and vertical length information or based on a relation with corresponding index information and neighboring quantization coefficients.

Figure 11:
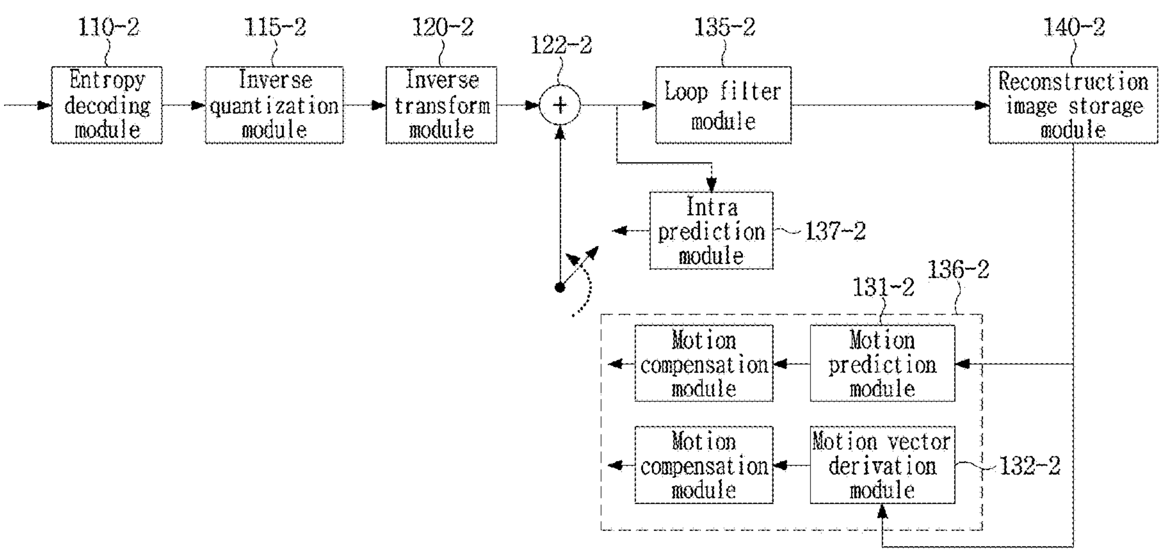
FIG. 11 is a block diagram illustrating a decoding apparatus according to an embodiment of the present invention.

FIG. 11 is a block diagram illustrating a decoder according to an embodiment of the present invention.

The decoder, which received the bitstream from the encoder, performs decoding through inter prediction 136-2 and intra prediction 137-2, schematically. According to the embodiment of the present invention, in decoding, when performing inter prediction, inter prediction is performed through the motion information received from the encoder, or inter prediction is performed through the motion information derived by the decoder. When performing inter prediction decoding using the motion information received from the encoder, a motion prediction module 131 calculates a motion vector of an actual corresponding block using a prediction motion vector (PMV) and a received motion vector difference value, and performs motion compensation using the calculated motion vector. When the decoder derives a motion vector and the derived motion information is used in inter prediction decoding, the motion vector is obtained by a motion derivation module and is used in performing motion compensation. The method of receiving the motion vector from the encoder or deriving the motion vector by the decoder may be selectively applied in inter prediction decoding, and selection information and relevant information may be received from the encoder through syntax information.

Figure 12:
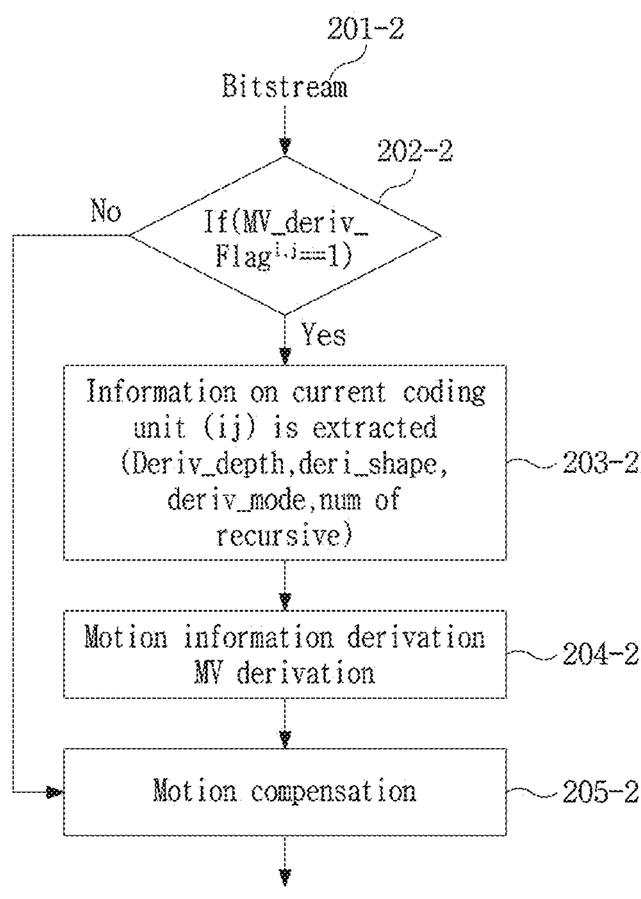
FIG. 12 is a flow chart illustrating motion derivation and motion compensation in a decoding unit subjected to motion derivation.

FIG. 12 is a decoding flowchart illustrating a case in which a method of deriving motion information by the decoder or a method of receiving the motion information from the encoder is selectively applied according to an embodiment of the present invention.

Figure 13:
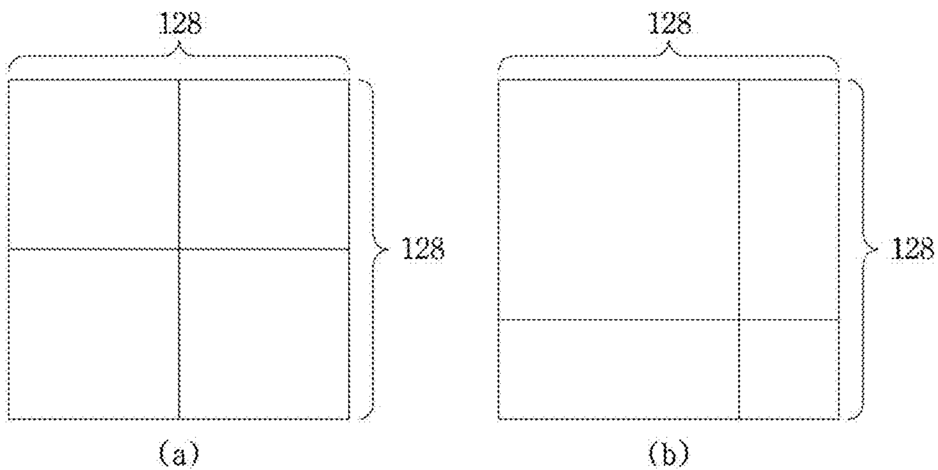
FIG. 13 is a diagram illustrating examples of partitioning into sub blocks when partitioning a decoding unit according to an embodiment of the present invention.

In the flowchart, steps after motion compensation are omitted. The decoder derives motion derivation flag ($MV\_deriv\_Flag_{i,j}$) information from the input bitstream 201-2. A motion derivation flag 202-2 is selection information on a motion derivation method, and on the basis of this, the decoder checks whether to perform decoding using the motion derivation method. The motion information derivation flag generally means selection information on the current decoding unit, but, according to the embodiment, may indicate the selection of the motion derivation method at various levels, such as a sequence, a frame, a frame group, a slice, a slice group, a decoding unit, a decoding unit group, a sub decoding unit, and the like. When the motion derivation flag is a value of 1, the decoding unit in which encoding is performed using the motion derivation method performs decoding through the motion derivation method. Here, the decoder further decodes motion derivation information on the current decoding unit at step 203-2. The motion derivation information on the current decoding unit may include at least one selected from a group of: depth information on the decoding unit to use the motion derivation method; information on a method of deriving the motion information in the motion derivation method; information on the shape/size/number of units or sub units to be subjected to motion derivation; and information on the number of iterations. Through one or more combinations of these types of information, the size, shape, and the like of the current decoding unit are defined, and motion derivation is performed at step 204-2. The depth information on the decoding unit is such information that information on the size of the block to be subjected to motion derivation at step 204-2 through an actual motion derivation method is found. When the block to which the motion derivation method is applied is 128×128 in size, when the depth information is a value of 2, and when the unit is in a square shape, partitioning into sub unit blocks is possible in the shape as shown in FIG. 13(*a*). This method may be determined by an arrangement between the encoder and the decoder. With the information received from the encoder, partitioning into blocks in predetermined size is possible by the decoder as shown in FIG. 13(*b*). When motion information on the current decoding unit is derived through motion derivation at step 204-2, the information is used in performing motion compensation at step 205-2.

Figure 14:
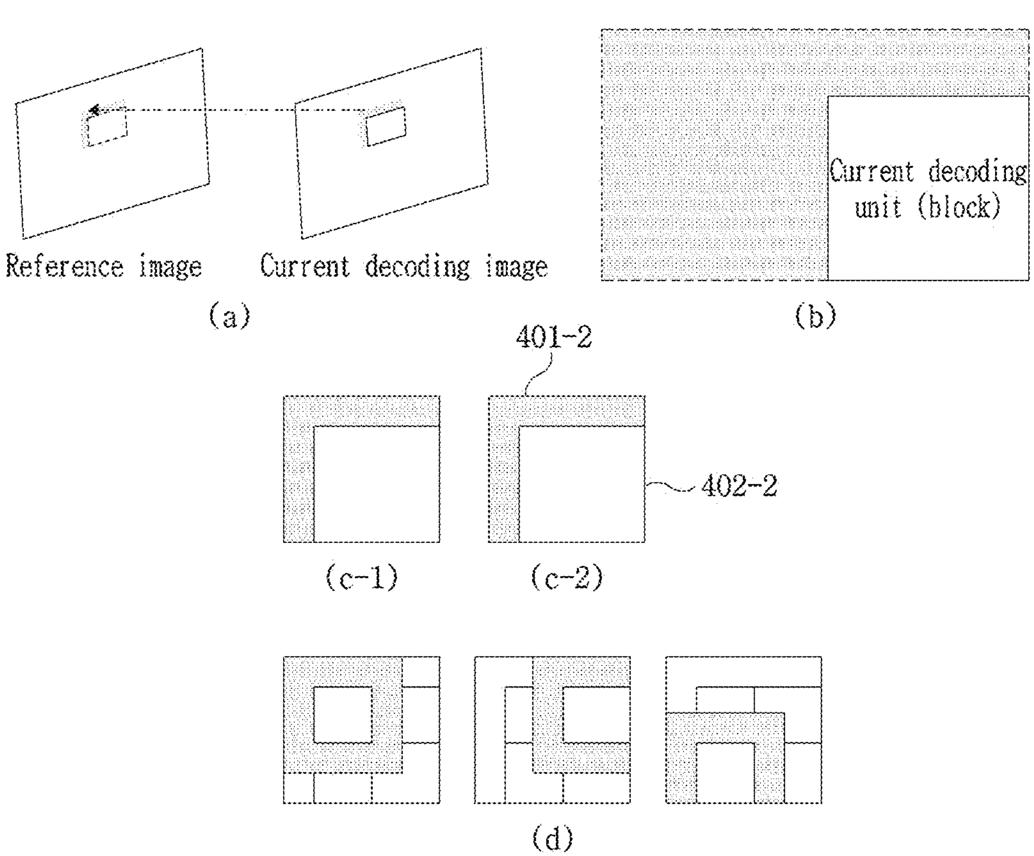
FIG. 14 is a diagram illustrating shapes of a neighboring pixel subjected to motion prediction in an example in which motion derivation is performed using neighboring pixel information on a decoding unit.

FIG. 14 is a diagram illustrating a method of predicting motion information on a current unit using neighboring pixel information on a current decoding unit or sub unit according to an embodiment of the present invention.

Figure 15:
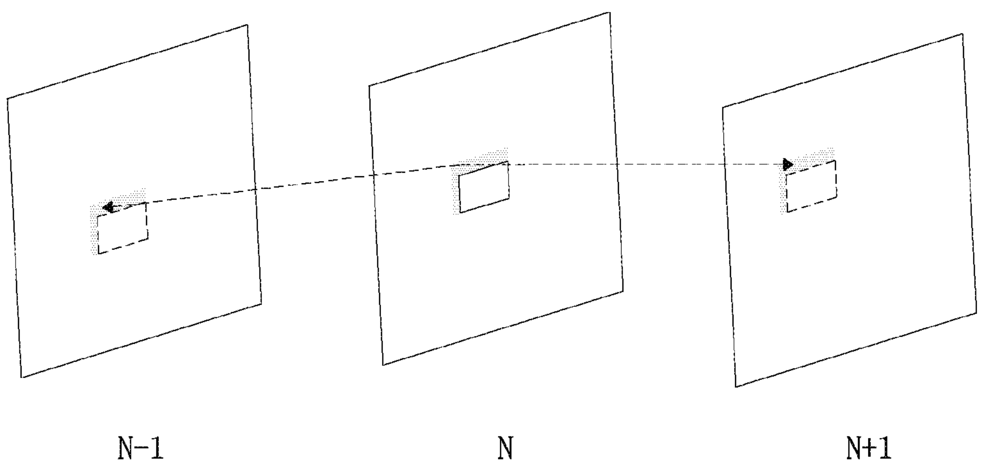
FIG. 15 is a diagram illustrating an embodiment in which the method in FIG. 14 is performed using two reference images.

This method is a method in which motion prediction is performed using the neighboring pixel information on the unit or sub unit and the result is used as a motion vector value of the current unit or sub unit. Here, in the current decoding unit, previously decoded regions may be utilized as regions in which motion prediction may be performed for the current decoding unit as shown in FIG. 14(*b*). Here, when current decoding unit is subjected to motion prediction using the region c-1, motion information on the current decoding unit is derived using motion prediction and is used in decoding. In this way, decoding may be completed. For more precise motion prediction, both a decoded region 402-2 and a region 401-2 previously used for motion prediction are used in performing motion prediction. Here, motion derivation, which is repeatedly performed, may be determined on the basis of the number of iterations, which is arranged by the encoder/decoder or information on the number of iterations, which is transmitted from the encoder to the decoder. When the current decoding unit is partitioned into sub units with the depth information on the decoding unit, motion derivation of each sub unit is possible using pieces of gray-shaded information shown in FIG. 14(*d*). As one embodiment, through an arrangement between the decoder and the encoder, the size, shape of the gray-shaded portion subjected to motion prediction may vary. Information thereon may include the value and shape fixed by the arrangement of the encoder/decoder, and there is a method of transmitting the information from the encoder to the decoder. The method of deriving the motion information on the current block using the neighboring pixel information is applicable to one or more reference images as shown in FIG. 15. When using multiple reference images, the motion vector value may be calculated by a common method used in video decoding. Here, examples of the common method include a method of calculating a motion value in proportion to a time difference value according to the time order of the reference images and the current decoding image.

Figure 16:
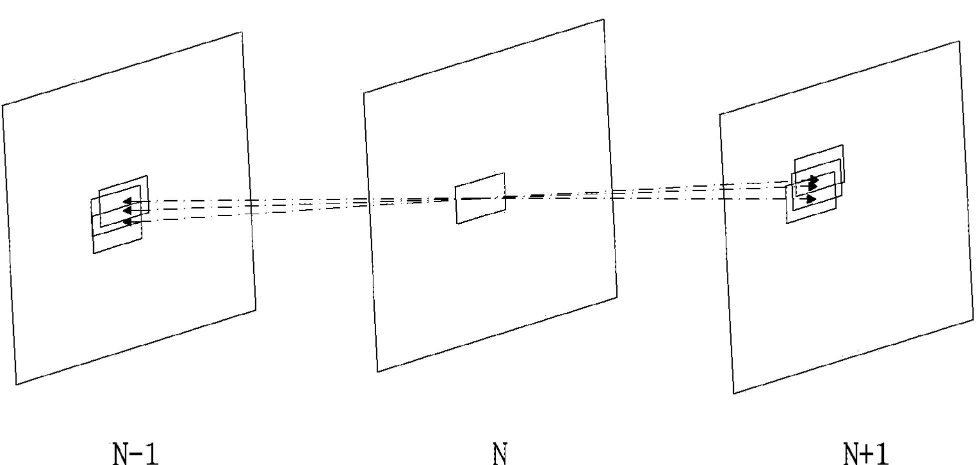
FIG. 16 is a diagram illustrating a method of deriving motion of a current decoding unit through motion prediction of co-located blocks using two reference images.

FIG. 16 is a diagram illustrating a method of deriving motion information of a current decoding unit using values of co-located blocks of the current decoding unit or sub unit according to an embodiment of the present invention. In general, a motion vector is calculated through a method of minimizing errors between co-located blocks in two or more reference images based on the current decoding unit. This method is also a method of predicting motion information on the current unit using neighboring pixel information. Various methods are possible through combinations of the information on the method of deriving the motion information, the shape of the unit or subunit to be subjected to motion derivation, the number of iterations, and the like.

Figure 17:
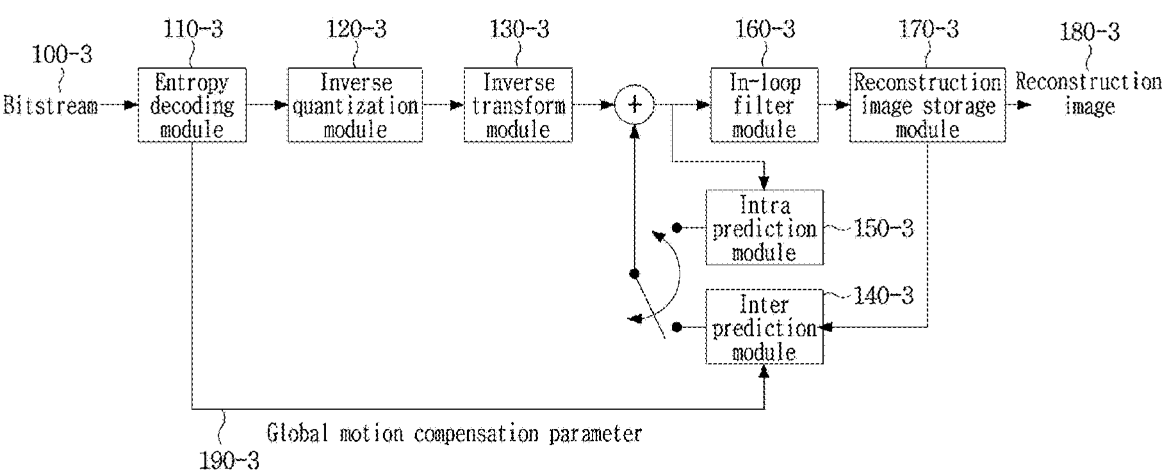
FIG. 17 is a diagram illustrating a decoding apparatus that performs global motion compensation according to an embodiment of the present invention.

FIG. 17 is a diagram illustrating a decoding apparatus that performs global motion compensation according to an embodiment of the present invention.

The decoding apparatus that performs global motion compensation may include at least one of an entropy decoding module 110-3, an inverse quantization module 120-3, an inverse transform module 130-3, an inter prediction module 140-3, an intra prediction module 150-3, an in-loop filter module 160-3, and a reconstruction image storage module 170-3.

The entropy decoding module 110-3 outputs decoding information such as syntax elements, a quantized coefficient, and the like by decoding the input bitstream 100-3. The output information may include information for global motion compensation.

The inverse quantization module 120-3 and the inverse transform module 130-3 receive the quantization coefficient, and perform inverse quantization and inverse transform in order, and the residual signal is output.

The inter prediction module 140-3 generates the prediction signal by performing motion compensation using the motion vector from extracted the bitstream and the reconstruction image stored in the reconstruction image storage module 170-3. The inter prediction module 140-3 performs global motion compensation on the global motion compensation region using information 190 for global motion compensation.

The intra prediction module 150-3 generates the prediction signal by performing spatial prediction using the pixel value of the pre-decoded neighboring block adjacent to the current decoding block.

The prediction signals output from the inter prediction module 140-3 and the intra prediction module 150-3 is added to the residual signal, and the reconstructed image generated through adding is transmitted to the in-loop filter module 160-3.

The reconstruction picture to which filtering is applied by the in-loop filter module 160-3 is stored in the reconstruction image storage module 170-3, and is used as a reference picture by the prediction module 140-3. The reconstruction image 180-3 is output from the reconstruction image storage module 170-3.

Figure 18:
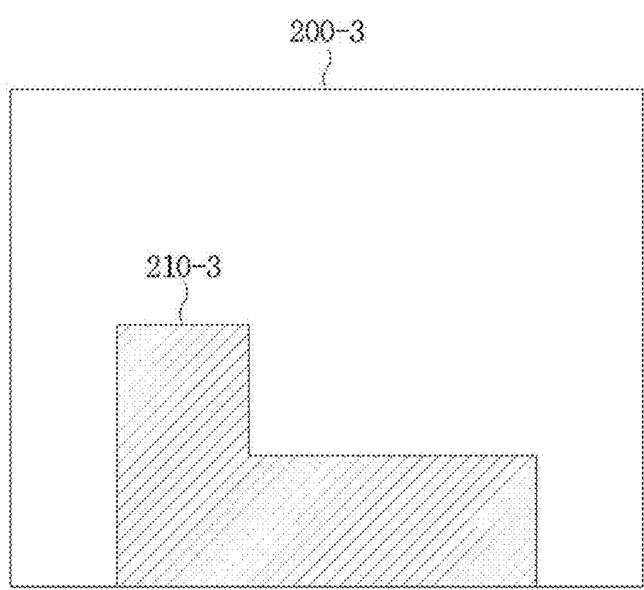
FIG. 18 is a diagram illustrating a method of performing global motion compensation on an image according to an embodiment of the present invention.

FIG. 18 is a diagram illustrating a method of performing global motion compensation on an image according to an embodiment of the present invention.

Global motion compensation may be performed on an extensive region 210-3 of an image 200-3 at once. In the process of reconstructing the image, a global motion compensation region 210-3 is determined, and motion compensation is performed at once on the determined global motion compensation region 210-3. The global motion compensation region 210-3 may be determined by the additional information transmitted to the decoder.

Figure 19:
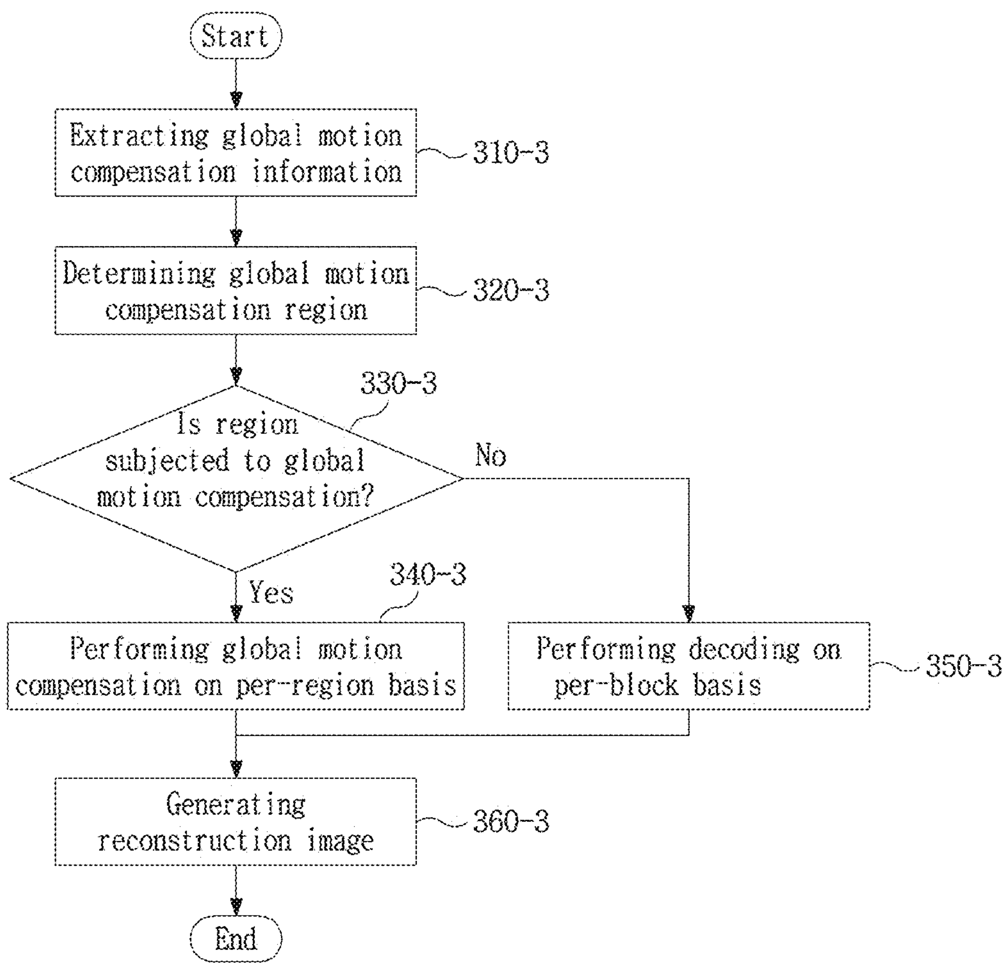
FIG. 19 is a block diagram illustrating a sequence of a method of performing global motion compensation according to an embodiment of the present invention.

FIG. 19 is a block diagram illustrating a sequence of a method of performing global motion compensation according to an embodiment of the present invention.

First, global motion compensation information is extracted from the bitstream at step 310-3. The extracted information is used to determine the global motion compensation region at step 320-3. By using the determined motion compensation region information, when the region is subjected to global motion compensation in the image, global motion compensation is performed at step 330-3 and the reconstruction image is generated at step 350-3. When the region is not subjected to global motion compensation, decoding on a per-block basis is performed at step 340-3 and the reconstruction image is generated at step 350-3.

Figure 20:
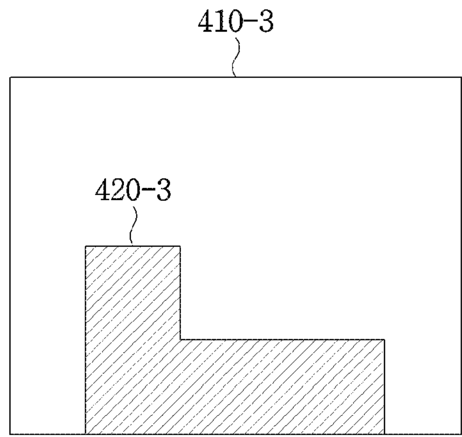
FIG. 20 is a diagram illustrating a method of determining a final global motion compensation region using information indicating an inside or an outside of a region determined as a global motion compensation region among pieces of information transmitted to a decoder, when performing global motion compensation according to an embodiment of the present invention.
Figure 20:
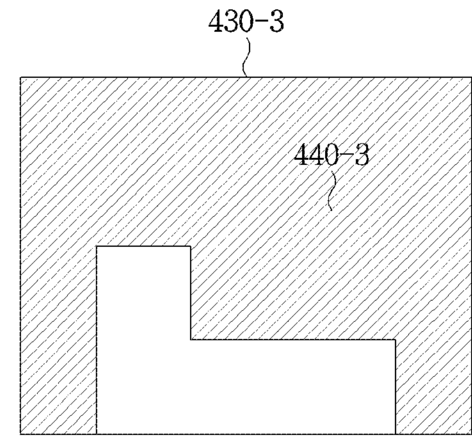

FIG. 20 is a diagram illustrating a method of determining a final global motion compensation region using information indicating an inside or an outside of a region determined as the global motion compensation region among pieces of information transmitted to the decoder, when performing global motion compensation according to an embodiment of the present invention.

By using motion global compensation region determination information included in information transmitted to the decoder, the global motion compensation region in the image is determined. By information indicating an inside or an outside of the determined global motion compensation region, the final global motion compensation region is determined. The information indicating the inside or the outside of the global motion compensation region may be transmitted in the flag form.

In FIG. 20, when a final global motion compensation region determination flag is a value of 0, the final global motion compensation region in the image is the inside 420-3 of the determined motion compensation region 410-3. When the final global motion compensation region determination flag is a value of 1, the final global motion compensation region of the image is the outside 440-3 of the determined motion compensation region 430-3.

Figure 21:
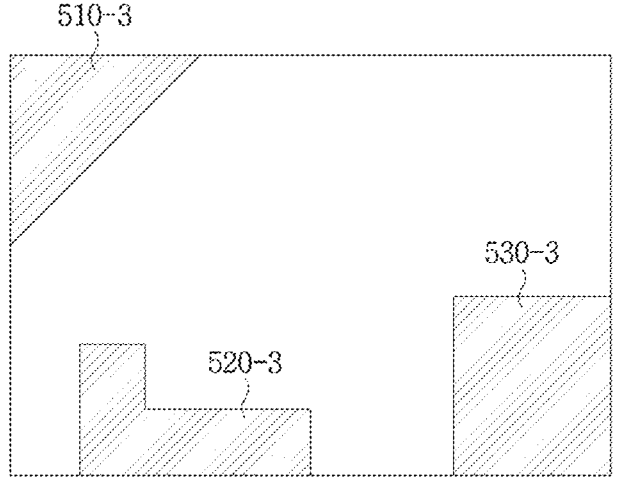
FIG. 21 is a diagram illustrating global motion compensation regions in various shapes when performing global motion compensation according to an embodiment of the present invention.

FIG. 21 is a diagram illustrating global motion compensation regions in various shapes when performing global motion compensation according to an embodiment of the present invention.

The global motion compensation regions 510-3, 520-3, and 530-3 may be provided in arbitrary shape, and multiple global motion compensation regions 510-3, 520-3, and 530-3 may be used within one image.

When multiple global motion compensation regions are used within one image, the motion compensation region is determined using individual information transmitted to each motion compensation region, or referring to information on another motion compensation region.

Figure 22:
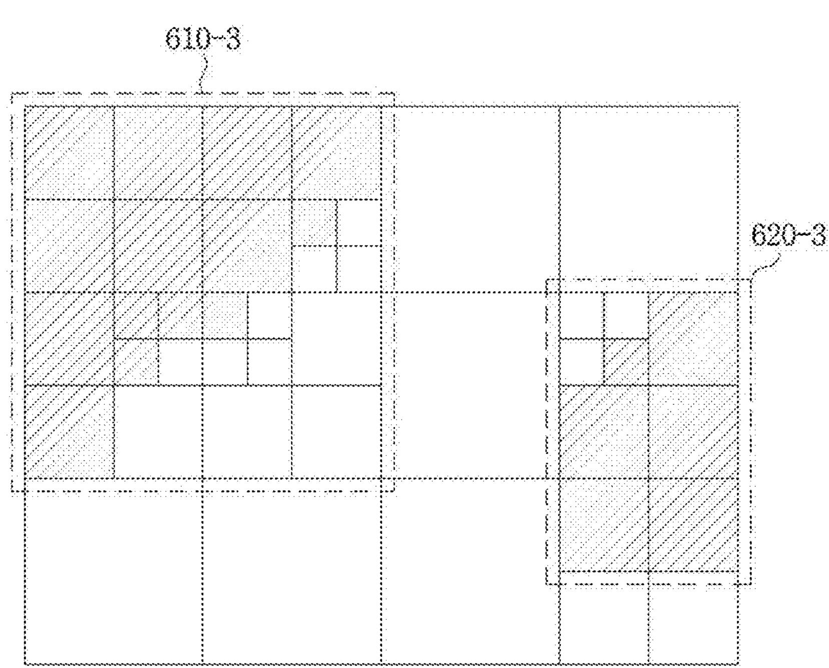
FIG. 22 is a diagram illustrating a method of determining a global motion compensation region according to boundaries on a per-coding unit basis when performing global motion compensation according to an embodiment of the present invention.

FIG. 22 is a diagram illustrating a method of determining a global motion compensation region according to boundaries on a per-coding unit basis when performing global motion compensation according to an embodiment of the present invention.

The global motion compensation regions may be determined as marked regions 610-3 and 620-3 according to boundaries on a per-decoding block basis.

Also, the global motion compensation regions may be partitioned blocks such as decoding blocks 610-3 and 620-3 hierarchically partitioned.

The information on the global motion compensation region is included in each decoding block, or information on each decoding block is included in each global motion compensation region.

Figure 23:
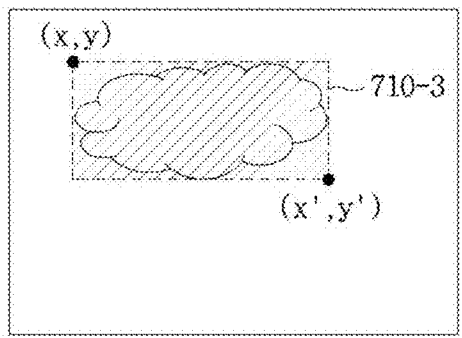
FIG. 23 is a diagram illustrating a method of determining a position of a global motion compensation region when performing global motion compensation according to an embodiment of the present invention.
Figure 23:
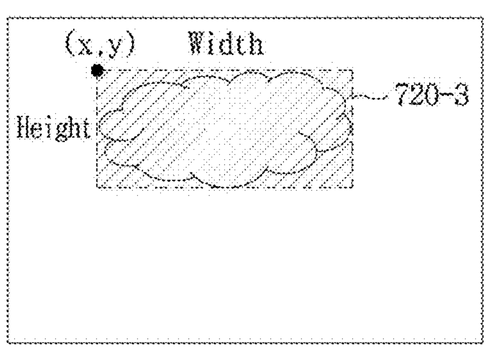

FIG. 23 is a diagram illustrating a method of determining a position of a global motion compensation region when performing global motion compensation according to an embodiment of the present invention.

Methods of determining the position of the global motion compensation region include a determination method 710-3 using coordinates of a start point (x, y) and an end point (x', y') of the region and a determination method 720-3 using coordinates of the start point (x, y) and the horizontal length (width) and vertical length (height) of the region.

Figure 24:
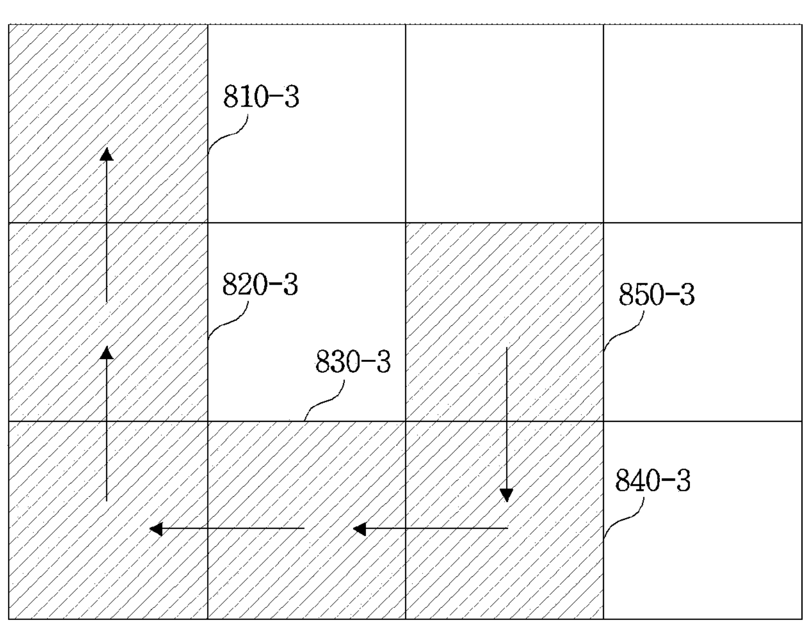
FIG. 24 is a diagram illustrating a method of determining a global motion compensation region by merging sections obtained through partition in a grid shape, when performing global motion compensation according to an embodiment of the present invention.

FIG. 24 is a diagram illustrating a method of determining a global motion compensation region by merging sections obtained through partition in a grid shape, when performing global motion compensation according to an embodiment of the present invention.

As a method of determining the global motion compensation region, there is a method of determining the global motion compensation region by partitioning the image into several sections in the grid shape and by merging each separated region with another region. A block 810-3, block 820-3, block 830-3, block 840-3, and block 850-3 are merged with a block in the direction the arrows points such that the global motion compensation region is reached. The block 850-3 is merged with the block 840-3 with reference thereto, the block 840-3 is merged with the block 830-3 with reference thereto, the block 830-3 is merged with the block 820-3 with reference thereto, and the block 820-3 is merged with the block 810-3 with reference thereto, thereby constructing the global motion compensation region.

Figure 25:
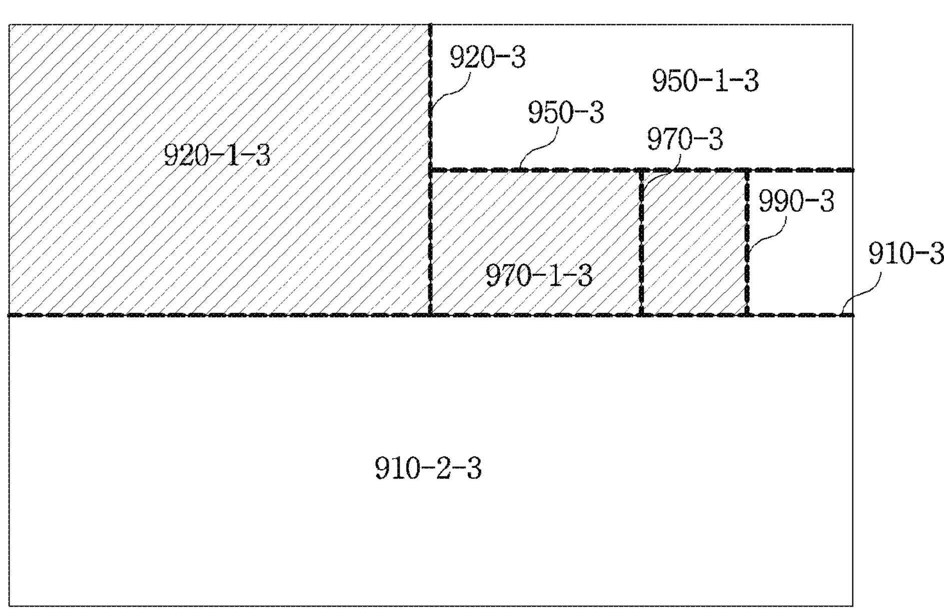
FIG. 25 is a diagram illustrating a method of determining a global motion compensation region by repeatedly partitioning an image in a horizontal or vertical direction, when performing global motion compensation according to an embodiment of the present invention.

FIG. 25 is a diagram illustrating a method of determining a global motion compensation region by repeatedly partitioning an image in a horizontal or vertical direction, when performing global motion compensation according to an embodiment of the present invention.

The global motion compensation region may be determined by repeatedly partitioning the image in the vertical or horizontal direction.

As shown in FIG. 25, the image may be partitioned according to the horizontal boundary 910-3 first, and then partitioned according to the vertical boundary 920-3. The region 910-2-3 obtained after partition according to the horizontal boundary 910-3 is a region which is no further partitioned, and the region 920-1-3 obtained after partition according to the vertical boundary 920-3 is also a region which is no further partitioned. Repeated partitioning is possible according to the horizontal boundary 950-3, the vertical boundary 970-3, and the vertical boundary 990-3. The region 950-1-3 obtained by partition according to the horizontal boundary 950-3 and the region 970-1-3 obtained by partition according to the vertical boundary 970-3 are regions which are no further partitioned.

The encoder may transmit information on boundaries for partition, and the decoder may determine the global motion compensation region using the received information on the boundaries.

Figure 26:
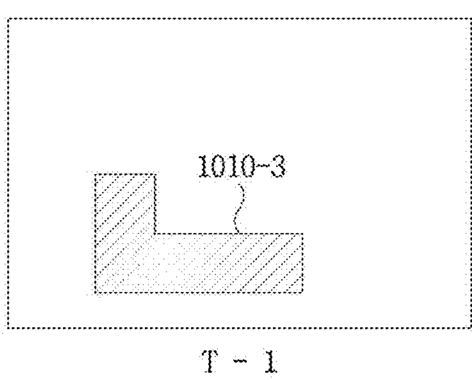
FIG. 26 is a diagram illustrating a method of determining a global motion compensation region using a warping parameter in addition information transmitted to a decoder when performing global motion compensation according to an embodiment of the present invention.
Figure 26:
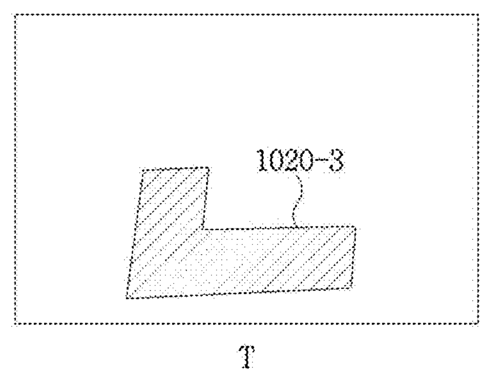

FIG. 26 is a diagram illustrating a method of determining a global motion compensation region using a warping parameter in addition information transmitted to a decoder when performing global motion compensation according to an embodiment of the present invention.

When an object 1010-3 is warped 1020-3 in two images at temporally different viewpoints, the encoder transmits a warping parameter to the decoder, and the decoder determines the motion compensation region using the received warping parameter.

Figure 27:
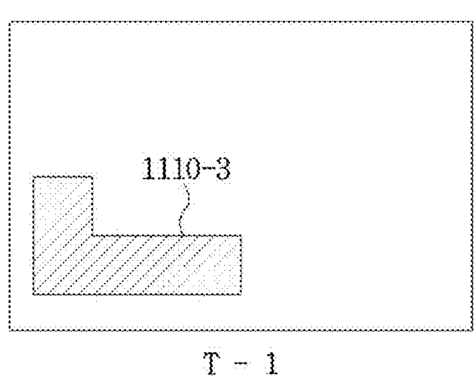
FIG. 27 is a diagram illustrating a method of rotating or scaling a global motion compensation region when performing global motion compensation according to an embodiment of the present invention.
Figure 27:
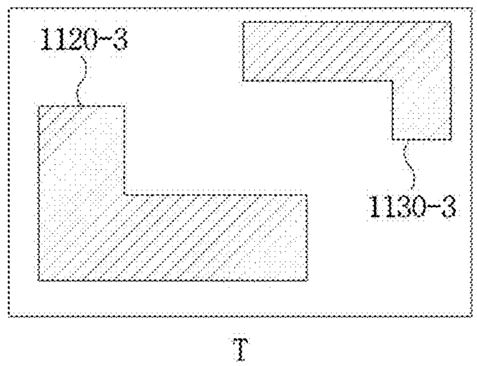

FIG. 27 is a diagram illustrating a method of rotating or scaling a global motion compensation region when performing global motion compensation according to an embodiment of the present invention.

When an object 1110-3 is scaled 1120-3 or rotated 1130-3 in two images at temporally different viewpoints, the encoder transmits scaling information or information on the rotated region to the decoder, and the decoder determines the motion compensation region using the received information.

Figure 28:
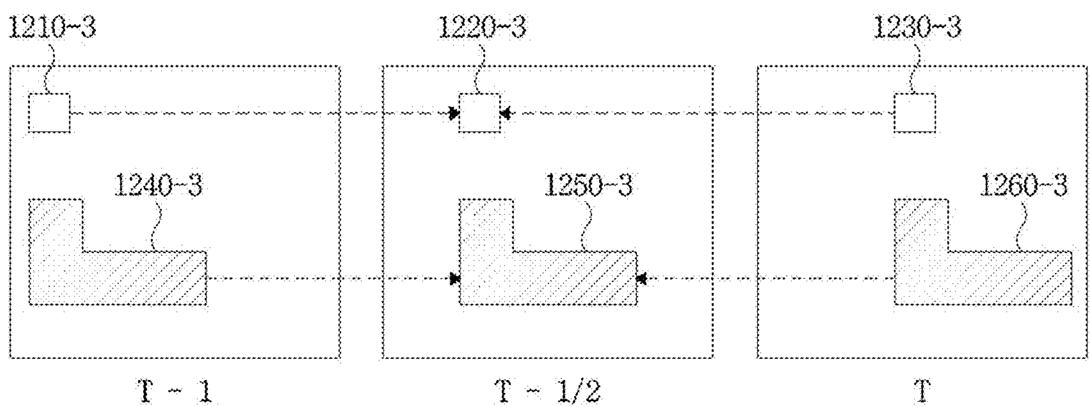
FIG. 28 is a diagram illustrating a case in which a frame rate up conversion (FRUC) method for increasing a frame rate is used when performing global motion compensation according to an embodiment of the present invention.

FIG. 28 is a diagram illustrating a case in which a frame rate up conversion (FRUC) method for increasing a frame rate is used when performing global motion compensation according to an embodiment of the present invention.

When performing the frame rate up conversion (FRUC) method on the image subjected to global motion compensation, synthesizing of a new frame between two frames through motion estimation on a per-block basis as well as synthesizing of a new frame through motion estimation on a per-global motion compensation region basis are possible.

In FIG. 28, when generating an image T-½ between a previous image T−1 and a subsequent image T, a synthesized block 1220-3 is generated using the block 1210-3 of the previous image and the block 1230-3 of the subsequent image, or a synthesized global motion region 1250-3 is generated using the global motion region 1240-3 of the previous image and the global motion region 1260-3 of the subsequent image.

Figure 29:
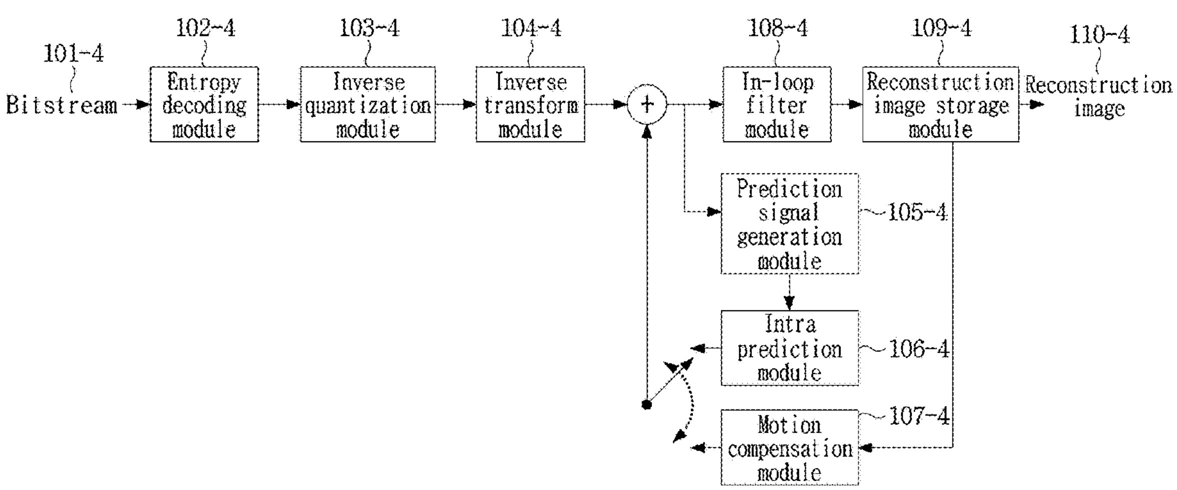
FIG. 29 is a diagram illustrating a video decoding apparatus capable of generating an intra prediction signal using intra prediction information in an encoded bitstream and of outputting a reconstruction image using the generated intra prediction signal according to an embodiment of the present invention.

FIG. 29 is a diagram illustrating a video decoding apparatus capable of generating an intra prediction signal using intra prediction information in an encoded bitstream and of outputting a reconstruction image using the generated intra prediction signal according to an embodiment of the present invention.

The input encoded bitstream 101-4 is decoded by an entropy decoding module 102-4. The residual signal is reconstructed through an inverse quantization module 103-4 and an inverse transform module 104-4. An intra prediction module 106-4 may perform intra prediction using the reconstruction signal for intra prediction generated by a prediction signal generation module 105-4. The prediction signal generation module 105-4 may perform a process of removing a portion of a high frequency component by applying a low-pass filter to the reconstruction signal for intra prediction. The motion compensation module 107-4 may perform inter prediction using the reconstruction signal of previous time stored in a reconstruction image storage module 109-4. The prediction signal generated through intra prediction or inter prediction and the residual signal are used in generating the reconstruction signal, and a filter is applied to the generated reconstruction signal through an in-loop filter module 108-4. The result may be stored in the reconstruction image storage module 109-4 to be referenced in the later picture, and may be output as a reconstruction image 110-4 according to output order of images.

Figure 30:
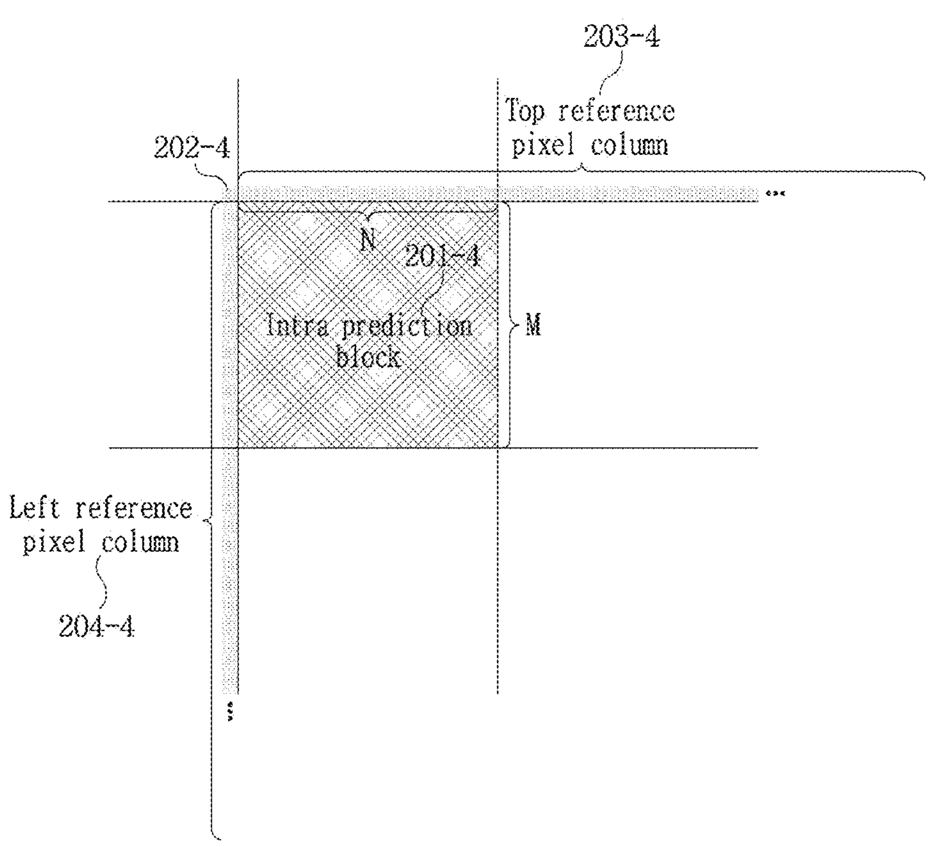
FIG. 30 is a diagram illustrating a referable region for an intra prediction block according to an embodiment of the present invention.

FIG. 30 is a diagram illustrating a referable region for an intra prediction block according to an embodiment of the present invention.

For intra prediction of a current intra prediction block 201-4 in an M×N size, a top left reference pixel 202-4, a top reference pixel column 203-4, and a left reference pixel column 204-4 may be used. The top reference pixel column 203-4 may be longer than the horizontal length N of the intra prediction block and may be (n*N) in length with respect to n which larger than 1. The left reference pixel column 204-4 may be longer than the vertical length M of the intra prediction block and may be (m*M) in length with respect to m which is larger than 1.

Figure 31:
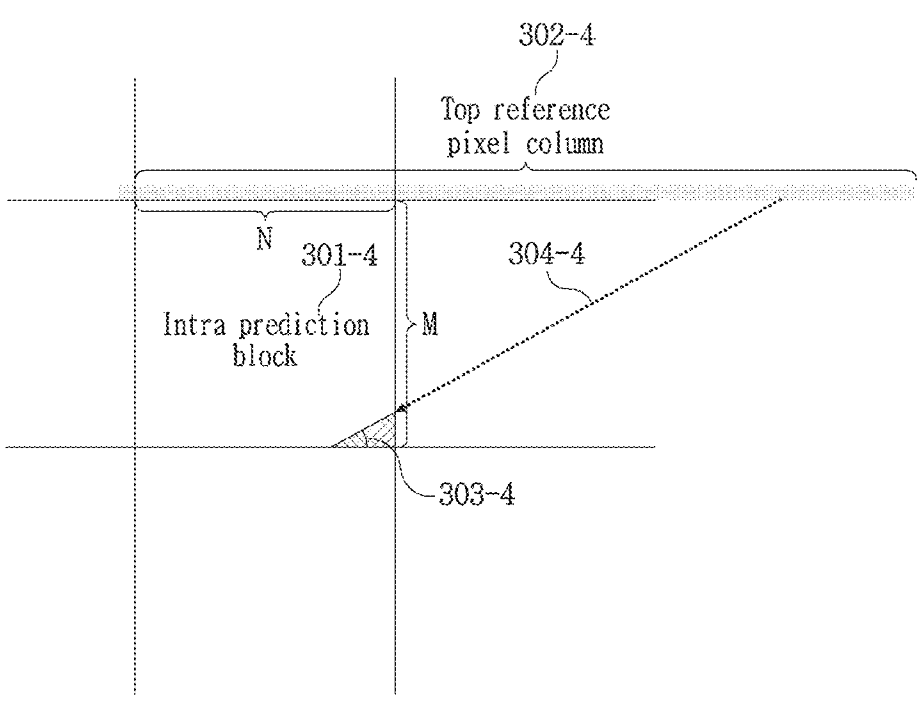
FIG. 31 is a diagram illustrating a method of performing directional intra prediction depending on a length of a reference pixel column according to an intra prediction method according to an embodiment of the present invention.

FIG. 31 is a diagram illustrating a method of performing directional intra prediction depending on a length of a top reference pixel column according to an intra prediction method according to an embodiment of the present invention.

For intra prediction of a current intra prediction block 301-4 in an M×N size, when a referable top reference pixel column 302-4 is longer than 2N in length, regarding directional intra prediction of the intra prediction block 301-4, intra prediction is performed using directional intra prediction 304-4 of which an angle 303-4 is smaller than an angle of 45 degrees.

Figure 32:
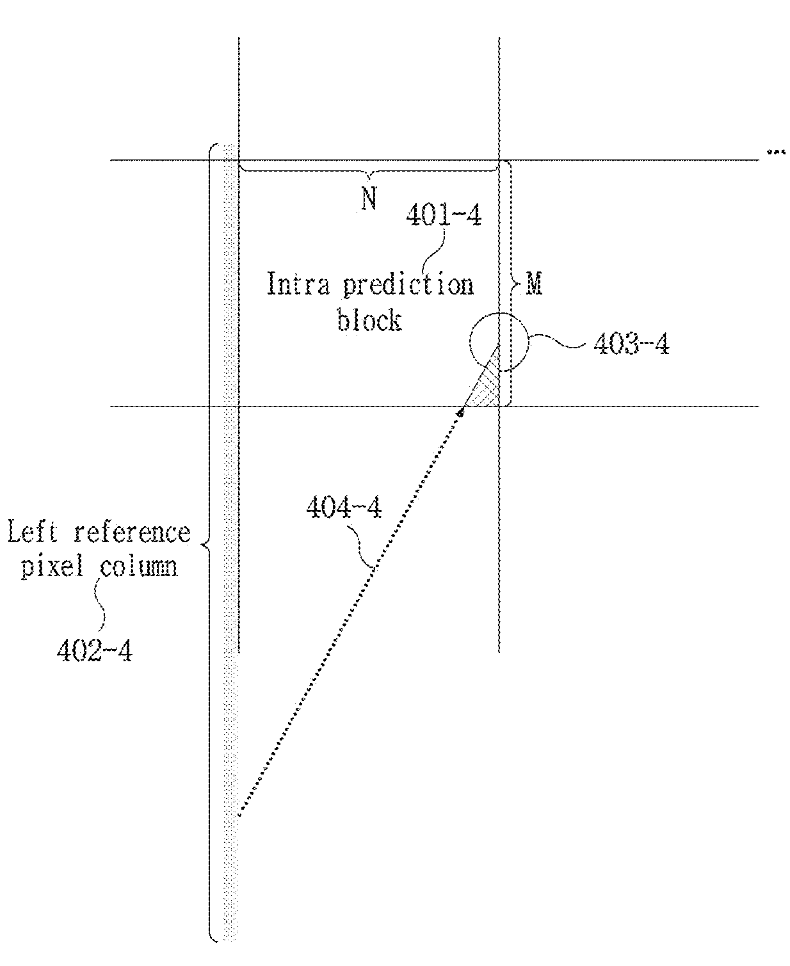
FIG. 32 is a diagram illustrating a method of performing directional intra prediction depending on a length of a left pixel column according to an intra prediction method according to an embodiment of the present invention.

FIG. 32 is a diagram illustrating a method of performing directional intra prediction depending on a length of a left reference pixel column according to an intra prediction method according to an embodiment of the present invention.

For intra prediction of a current intra prediction block 401-4 in an M×N size, when a referable left reference pixel column 402-4 is longer than 2M in length, regarding directional intra prediction of the intra prediction block 401-4, intra prediction is performed using directional intra prediction 404-4 of which an angle 403-4 is larger than an angle of 315 degrees.

Figure 33:
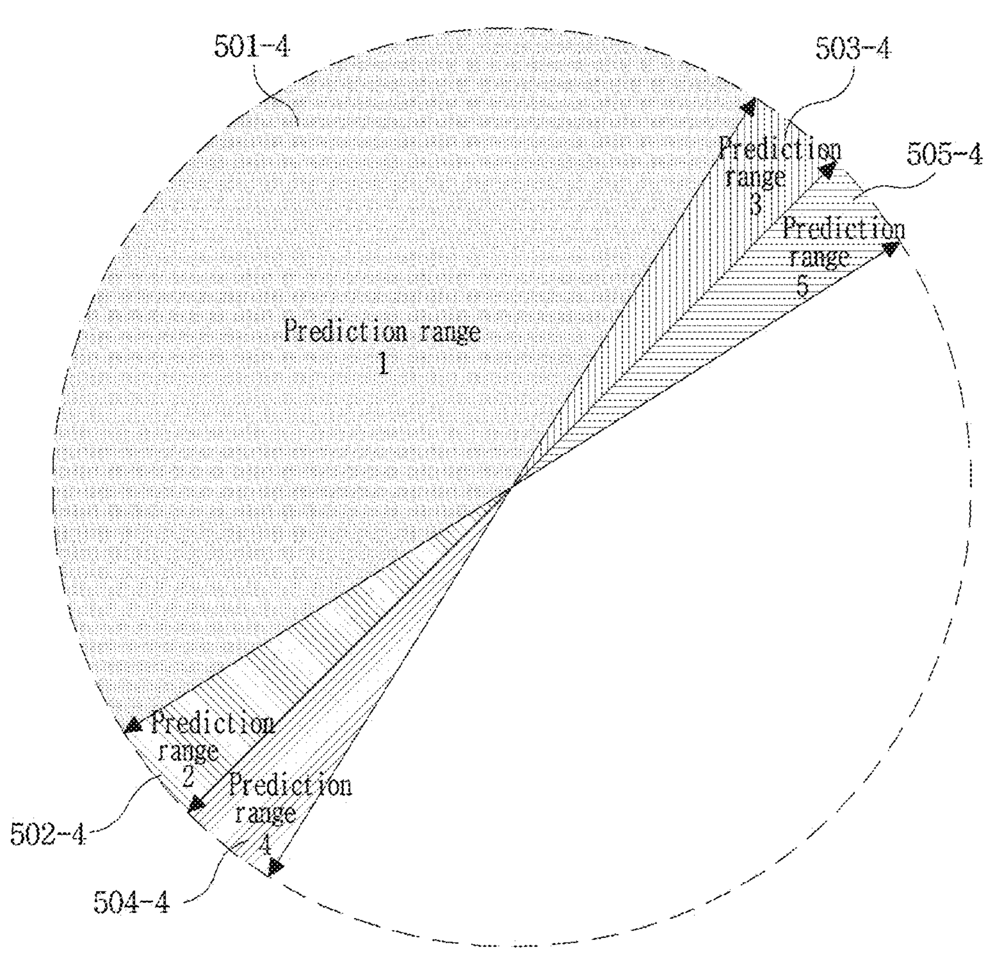
FIG. 33 is a diagram illustrating ranges of applicable directional prediction in an intra prediction method according to an embodiment of the present invention.

FIG. 33 is a diagram illustrating ranges of applicable directional prediction in an intra prediction method according to an embodiment of the present invention.

In the proposed intra prediction method, applicable directional prediction is on the basis of a range of directional prediction with an angle ranging from 45 degrees to 315 degrees including a prediction range 1 501-4, a prediction range 2 502-4, and a prediction range 3 503-4. When with respect to a horizontal length N of a current intra prediction block, a top reference pixel column is longer than 2N in length, intra prediction is performed in a directional prediction mode of one of ranges corresponding to the prediction range 1 501-4, the prediction range 3 503-4, and the prediction range 5 505-4. When with respect to a vertical length M of a current intra prediction block, a left reference pixel column is longer than 2M in length, intra prediction is performed in a direction prediction mode of one of ranges corresponding to the prediction range 1 501-4, the prediction range 2 502-4, and the prediction range 4 504-4. The prediction range depending on the length of the reference pixel column may be adaptively determined according to whether the reference pixel column is decoded or not. Alternatively, through a syntax element, a prediction range to be used for intra prediction of the current intra prediction block may be signaled.

Figure 34:
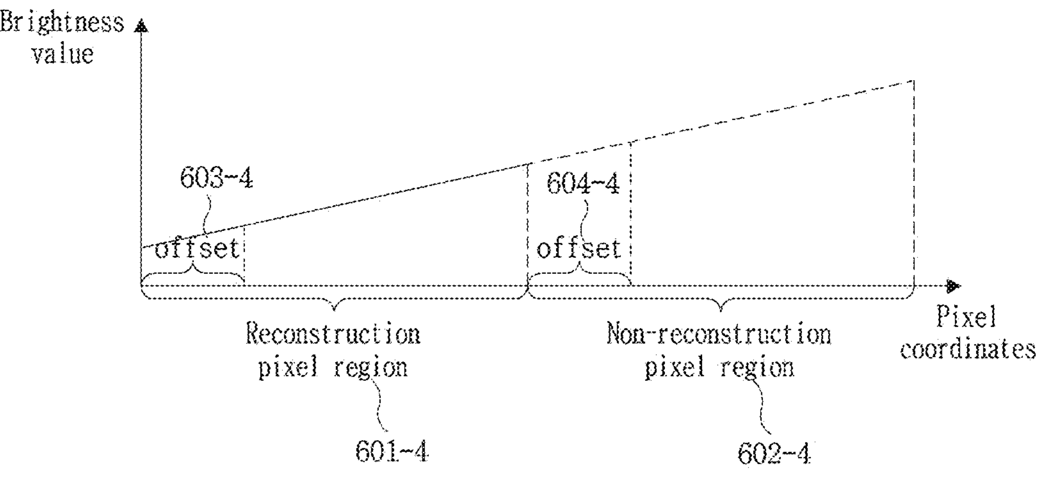
FIG. 34 is a diagram illustrating a method of generating an intra prediction signal by varying a brightness of a pixel with the same slope as a reconstruction pixel region from a signal of a neighboring reconstruction pixel region depending on pixel coordinates of a non-reconstruction pixel region in an intra prediction method according to an embodiment of the present invention.

FIG. 34 is a diagram illustrating a method of generating an intra prediction signal by varying the brightness of a pixel with the same slope as a reconstruction pixel region from a signal of a reconstruction pixel region depending on pixel coordinates of a non-reconstruction pixel region in an intra prediction method according to an embodiment of the present invention.

With respect to a reconstruction pixel region 601-4 included in a reconstructed neighboring block adjacent to a current intra prediction block, when there is a non-reconstruction pixel region 602-4 adjacent to the reconstruction pixel region continually, the prediction signal is generated in such a manner that a variation in a pixel value at a position spaced apart from a start position of the reconstruction pixel region by a predetermined offset 603-4 is equal to a variation in a pixel value at a position spaced apart from a start position of the non-reconstruction pixel region by an offset 604-4 which is the same as the above-described offset. After, signal of the reconstruction pixel region 601-4 and the newly generated non-reconstruction pixel region 602-4 may be referenced for intra prediction.

Figure 35:
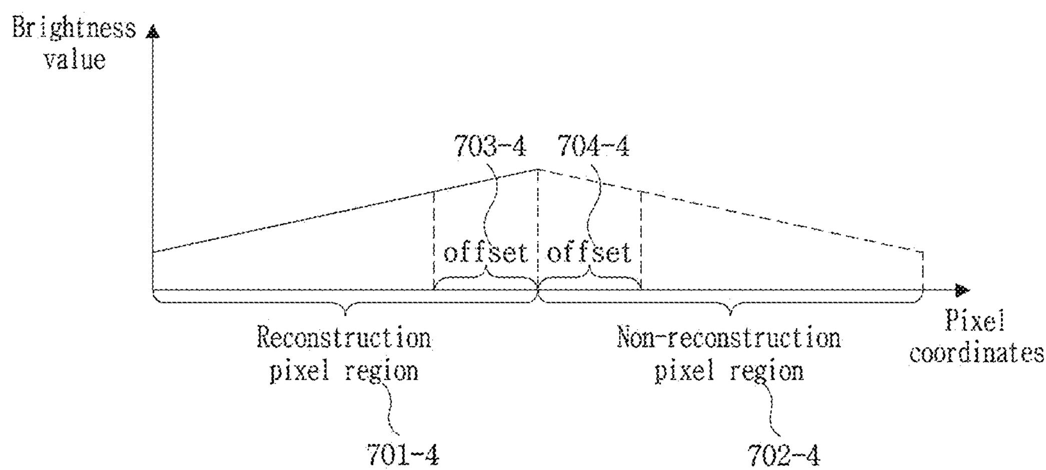
FIG. 35 is a diagram illustrating a method of generating an intra prediction signal by varying a brightness of a pixel with a negative slope having the same size as a reconstruction pixel region depending on pixel coordinates of a non-reconstruction pixel region from a signal of a neighboring reconstruction pixel region in an intra prediction method according to an embodiment of the present invention.

FIG. 35 is a diagram illustrating a method of generating an intra prediction signal by varying a brightness of a pixel with a negative slope having the same size as a reconstruction pixel region depending on pixel coordinates of a non-reconstruction pixel region from a signal of a neighboring reconstruction pixel region in an intra prediction method according to an embodiment of the present invention.

With respect to a reconstruction pixel region 701-4 included in a reconstructed neighboring block adjacent to a current intra prediction block, when there is a non-reconstruction pixel region 702-4 adjacent to the reconstruction pixel region continually, the prediction signal is generated in such a manner that a variation in a pixel value at a position spaced apart from an end position of the reconstruction pixel region by a predetermined offset 703-4 is equal to a variation in a pixel value at a position spaced apart from a start position of the non-reconstruction pixel region by an offset 704-4 which is the same as the above-described offset and the signs of the slopes are opposite to each other. After, signals of the reconstruction pixel region 701-4 and the newly generated non-reconstruction pixel region 702-4 may be referenced for intra prediction.

Figure 36:
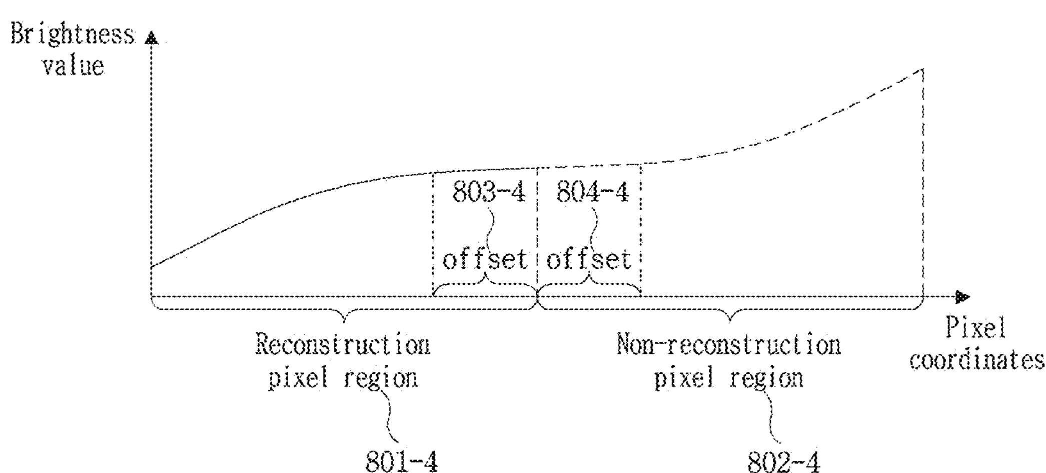
FIG. 36 is a diagram illustrating another method of generating an intra prediction signal by varying a brightness of a pixel with the same slope as a reconstruction pixel region from a signal of a neighboring reconstruction pixel region depending on pixel coordinates of a non-reconstruction pixel region in an intra prediction method according to an embodiment of the present invention.

FIG. 36 is a diagram illustrating another method of generating an intra prediction signal by varying a brightness of a pixel with the same slope as a reconstruction pixel region from a signal of a neighboring reconstruction pixel region depending on pixel coordinates of a non-reconstruction pixel region in an intra prediction method according to an embodiment of the present invention.

With respect to a reconstruction pixel region (801-4) included in a reconstructed neighboring block adjacent to a current intra prediction block, when there is a non-reconstruction pixel region 802-4 adjacent to the reconstruction pixel region continually, the prediction signal is generated in such a manner that a variation in a pixel value at a position spaced apart from an end position of the reconstruction pixel region by a predetermined offset 803-4 is equal to a variation in a pixel value at a position spaced apart from a start position of the non-reconstruction pixel region by an offset 804-4 which is the same as the above-described offset. After, signals of the reconstruction pixel region 801-4 and the newly generated non-reconstruction pixel region 802-4 may be referenced for intra prediction.

FIG. 37 is a diagram illustrating a method of signaling whether intra prediction is performed, which is proposed by a sequence parameter set of a high-level syntax for an intra prediction method according to an embodiment of the present invention.

In the proposed intra prediction method, whether it is possible to apply the proposed intra prediction method within a sequence parameter set 901 among network abstract layer (NAL( ) units existing in a compression bitstream is expressed in the flag 902-4 form of a 1-bit "seq_model_intra_enabled_flag". When the value of the relevant flag is true, pictures that refer to the sequence parameter set are decoded using the proposed intra prediction method.

FIG. 38 is a diagram illustrating a method of signaling whether intra prediction is performed which is proposed by a picture parameter set of a high-level syntax for an intra prediction method according to an embodiment of the present invention.

In the proposed intra prediction method, whether it is possible to apply the proposed intra prediction method within a picture parameter set 1001-4 among network abstract layer (NAL) units existing in a compression bitstream is expressed in the form of 1-bit a flag 1002-4 "pic_model_intra_enabled_flag". When the value of the relevant flag is true, slices that refer to the picture parameter set are decoded using the proposed intra prediction method. Also, when the value of "pic_model_intra_enabled_flag" transmitted within the picture parameter set is true, whether it is possible to apply the proposed prediction method to intra prediction blocks in all sizes allowable within a picture is expressed in the form of a 1-bit flag 1003-4 "pic_model_intra_all_blk_sizes_flag". When the value of pic_model_intra_enabled_flag is true and the value of pic_model_intra_all_blk_sizes_flag is false, among the intra prediction blocks included in the current picture, min_log 2_model_intra_blk_size 1004-4 and max_log 2_model_intra_blk_size 1005-4 which are log values to base 2 of the minimum size and the maximum size of blocks to which the proposed intra prediction method is possibly applied are transmitted in the form of an exponential-Golomb code.

FIG. 39 is a diagram illustrating a method of signaling whether intra prediction is performed which is proposed by a slice segment header of a high-level syntax for an intra prediction method according to an embodiment of the present invention.

In the proposed intra prediction, whether it is possible to apply the proposed intra prediction method within a slice segment header 1101-4 among network abstract layer (NAL) units existing in a compression bitstream is expressed in the form of 1-bit a flag 1102-4 slice_model_intra_enabled_flag. When the value of the relevant flag is true, blocks that refer to the slice segment header are decided using the proposed intra prediction method.

Figure 40:
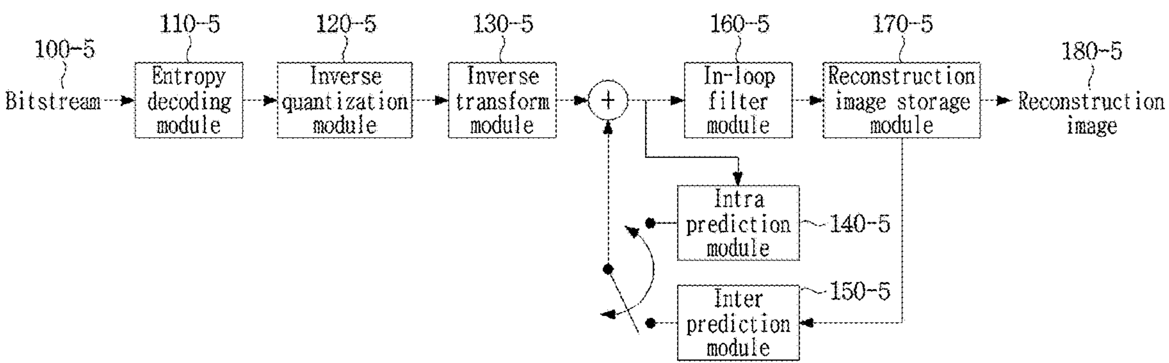
FIG. 40 is a diagram illustrating a decoding apparatus including an intra prediction module according to an embodiment of the present invention.

FIG. 40 is a diagram illustrating a decoding apparatus including an intra prediction module according to an embodiment of the present invention.

The decoding apparatus which including the intra prediction module may include at least one of an entropy decoding module 110-5, an inverse quantization module 120-5, an inverse transform module 130-5, an intra prediction module 140-5, an inter prediction module 150-5, an in-loop filter module 160-5, and a reconstruction image storage module 170-5.

The entropy decoding module 110-5 outputs decoding information, such as syntax elements, the quantized coefficient, and the like, by decoding the input bitstream 100-5. The output information may include information for global motion compensation.

The inverse quantization module 120-5 and the inverse transform module 130-5 receive the quantization coefficient and perform inverse quantization and inverse transform in order, and the residual signal is output.

The intra prediction module 140-5 generates the prediction signal by performing spatial prediction using the pixel value of the pre-decoded neighboring block adjacent to the current decoding block. A neighboring pixel value in a curve direction may be used for prediction signal generation.

The inter prediction module 150-5 generates the prediction signal by performing motion compensation using the motion vector extracted from the bitstream and the reconstruction image stored in the reconstruction image storage module 170-5.

The prediction signals output from the intra prediction module 140-5 and the inter prediction module 150-5 are added to the residual signal, and thus the reconstructed image generated through adding is transmitted to the in-loop filter module 160-5.

The reconstruction picture to which filtering is applied by the in-loop filter module 160-5 is stored in the reconstruction image storage module 170-5, and is used as a reference picture by the inter prediction module 150-5.

Figure 41:
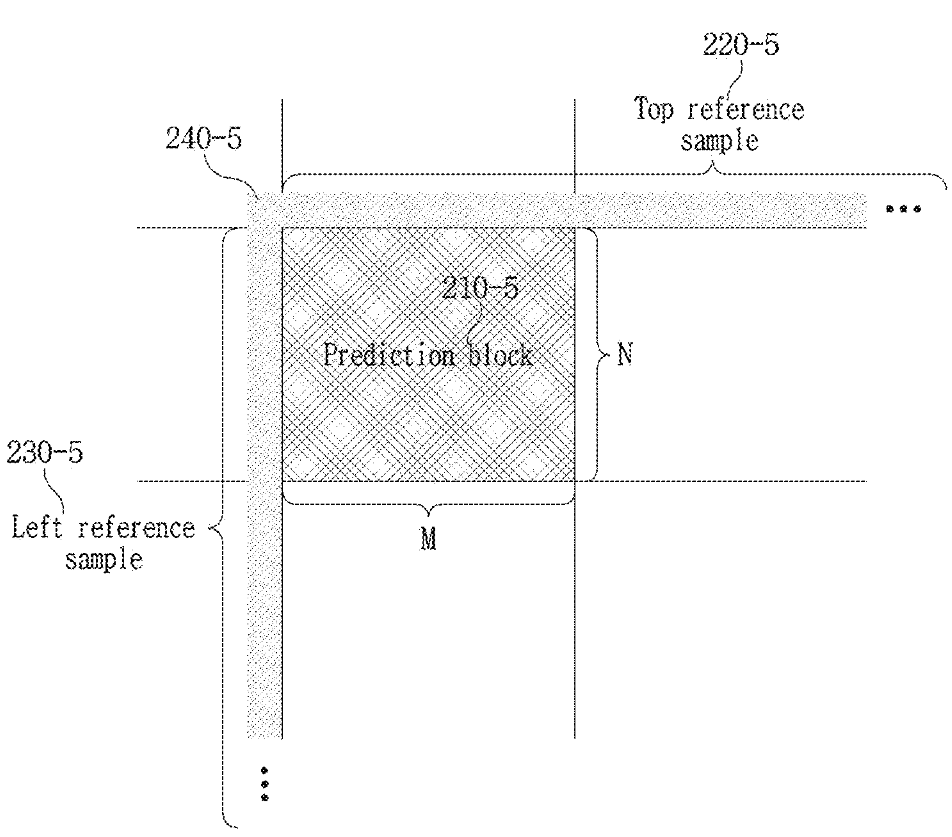
FIG. 41 is a diagram illustrating neighboring reference regions when performing intra prediction according to an embodiment of the present invention.

FIG. 41 is a diagram illustrating neighboring reference regions when performing intra prediction according to an embodiment of the present invention.

In order to generate a prediction sample of a current intra prediction block 210-5 in an M×N size, a top reference sample 220-5, a left reference sample 230-5, and a top left reference sample 240-5 may be used.

The length of the top reference sample 220-5 column may be longer than the horizontal length M of the current intra prediction block 210-5. Also, the length of the left reference sample 230-5 column may be longer than the vertical length N of the current intra prediction block 210.

Figure 42:
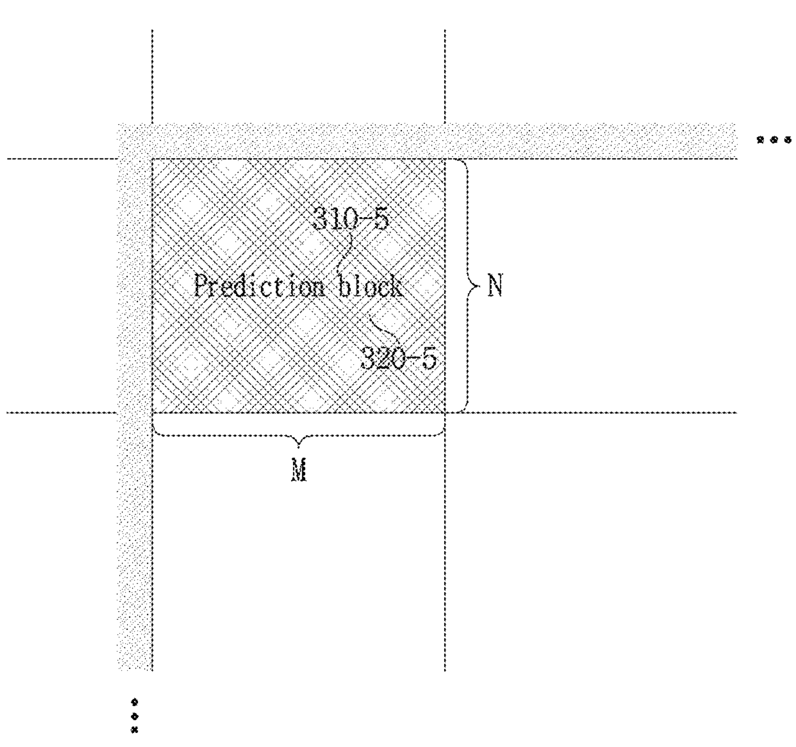
FIG. 42 is a diagram illustrating a method of referring to a pixel of a neighboring block when performing intra prediction according to an embodiment of the present invention.

FIG. 42 is a diagram illustrating a method of referring to a pixel of a neighboring block when performing intra prediction according to an embodiment of the present invention.

When generating a prediction sample of a current intra prediction block 310-5 in an M×N size, the prediction signal is generated using a reference sample in a curve 320-5 direction. The curve is expressed in an N-th degree equation, or may be a straight line depending on a coefficient.

Information on the curve may be transmitted as being included in the bitstream, and the information may include a degree or a coefficient of a curve equation.

Figure 43:
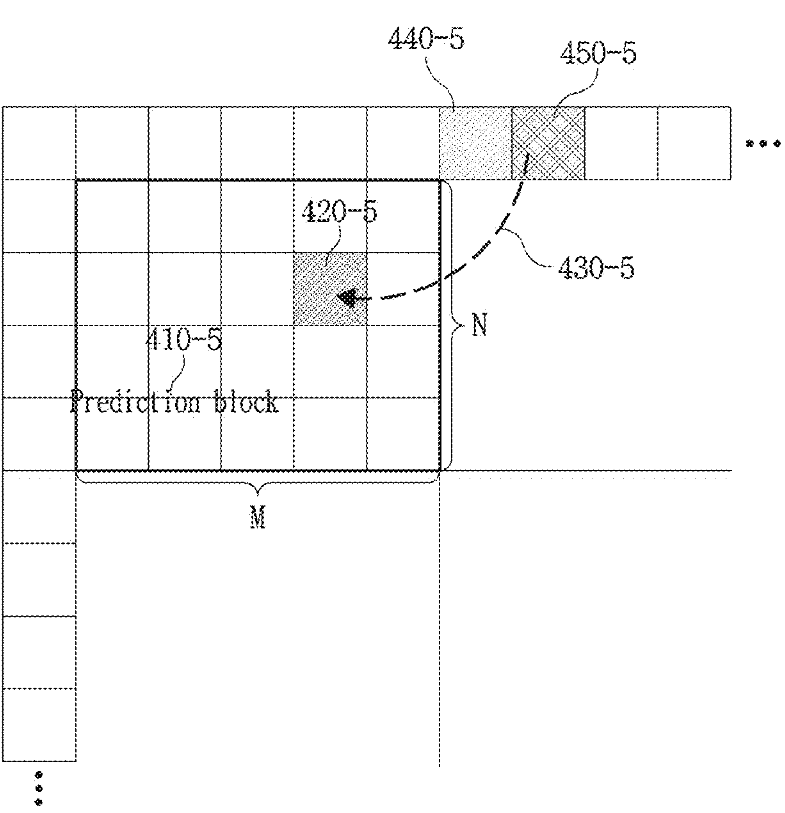
FIG. 43 is a diagram illustrating a method of referring to multiple pixels of a neighboring block when performing intra prediction according to an embodiment of the present invention.

FIG. 43 is a diagram illustrating a method of referring to multiple pixels of a neighboring block when performing intra prediction according to an embodiment of the present invention.

When generating a prediction sample 420-5 of a current intra prediction block 410-5 in an M×N size, one or two or more pixels of a neighboring block in a curve 430-5 direction may be referenced.

When using two or more reference samples, the prediction sample 420-5 is generated with a weighted average value of reference samples 440-5 and 450-5.

Figure 44:
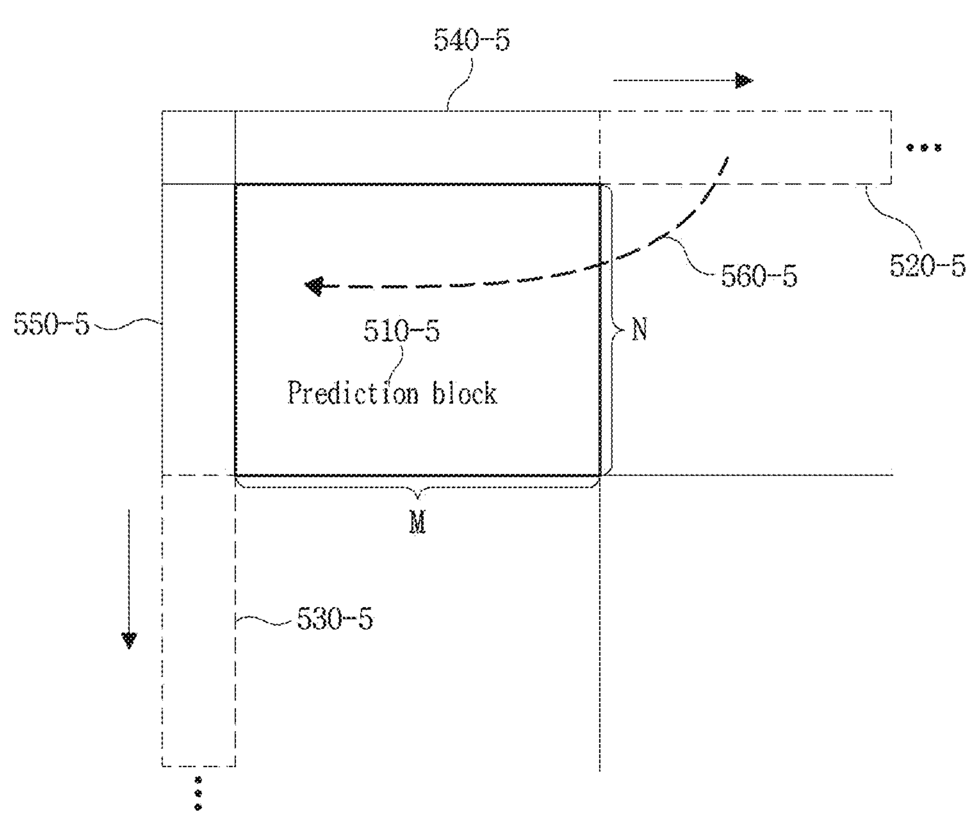
FIG. 44 is a diagram illustrating a method of generating a non-existing reference sample in a neighboring block, when performing intra prediction according to an embodiment of the present invention.

FIG. 44 is a diagram illustrating a method of generating a non-existing reference sample in a neighboring block, when performing intra prediction according to an embodiment of the present invention.

When a reference sample is partially present near a current intra prediction block 510-5 in an M×N size, a non-existing reference sample is generated using available reference samples 540-5 and 550-5.

When generating non-existing reference samples 520-5 and 530-5, the length of the reference sample to be generated may differ depending on a curve 560 used in the current prediction block.

Figure 45:
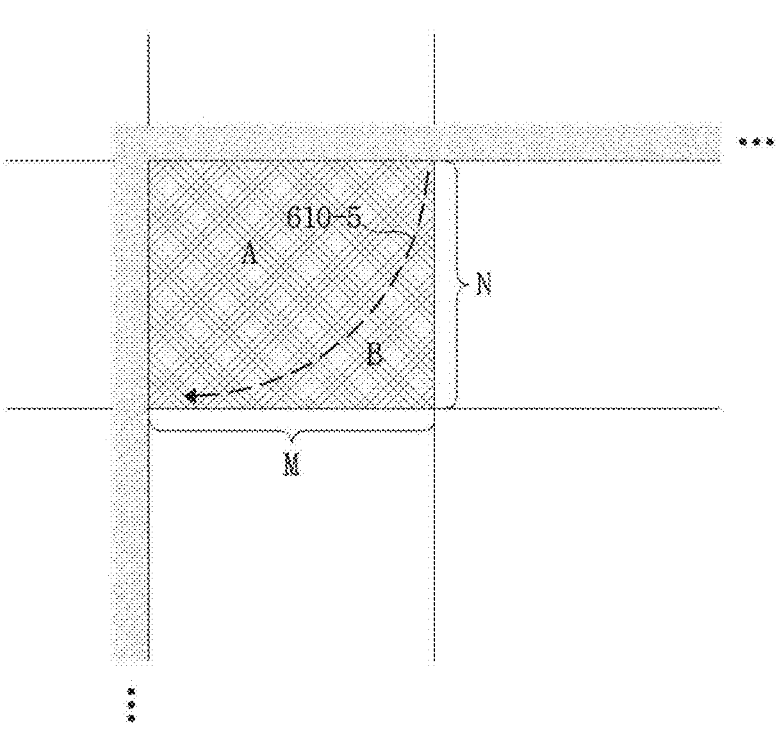
FIG. 45 is a diagram illustrating a method of performing prediction using reference samples in different directions in respective regions of a prediction block, when performing intra prediction according to an embodiment of the present invention.

FIG. 45 is a diagram illustrating a method of performing prediction using reference samples in different directions in respective regions of a prediction block, when performing intra prediction according to an embodiment of the present invention.

When a current intra prediction block in an M×N size is divided into two sections A and B by this curve 610-5, prediction samples are generated in the sections A and B using reference samples in different directions.

One or more reference samples may be used to generate the prediction sample in the section A or section B, and one or more reference samples may be positioned in different directions.

Figure 46:
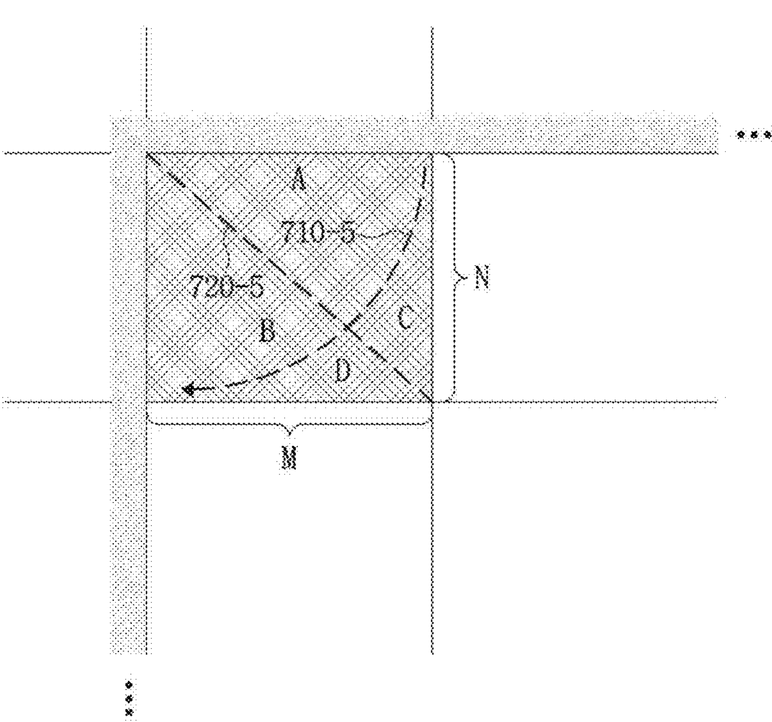
FIG. 46 is a diagram illustrating another method of performing prediction using reference samples in different directions in respective regions of a prediction block, when performing intra prediction according to an embodiment of the present invention.

FIG. 46 is a diagram illustrating another method of performing prediction using reference samples in different directions in respective regions of a prediction block, when performing intra prediction according to an embodiment of the present invention.

When a current intra prediction block in an M×N size is divided into sections A, B, C, and D by a curve 710-5 and a straight line 720-5 connecting edges of the block, prediction samples are generated in the sections A, B, C, and D using reference samples in different directions.

One or more reference samples may be used to generate the prediction sample in each of the sections A, B, C, and D, and one or more reference samples may be positioned in different directions.

Figure 47:
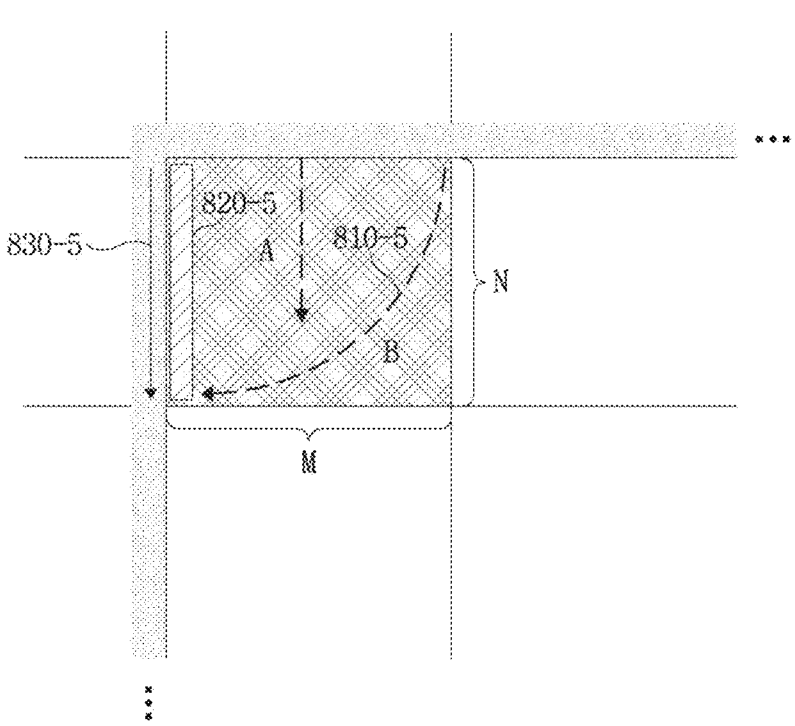
FIG. 47 is a diagram illustrating a method of performing filtering on a leftmost prediction sample column of a prediction block so as to remove discontinuity to a neighboring block, when performing intra prediction according to an embodiment of the present invention.

FIG. 47 is a diagram illustrating a method of performing filtering on a leftmost prediction sample column of a prediction block so as to remove discontinuity to a neighboring block, when performing intra prediction according to an embodiment of the present invention.

Among regions obtained by dividing a current intra prediction block in an M×N size with a curve or straight line, when a region subjected to vertical direction prediction is positioned on the left of the prediction block, filtering is performed on a prediction sample in a leftmost column of the prediction block.

When performing filtering on samples in the leftmost column of the prediction block, a left reference sample variation is used.

For example, as shown in FIG. 47, prediction block is divided into two regions A and B by a curve 810-5. When the region A is subjected to vertical direction prediction, filtering is performed on prediction samples in the leftmost column 820-5 using a variation 830-5 in left reference samples.

Figure 48:
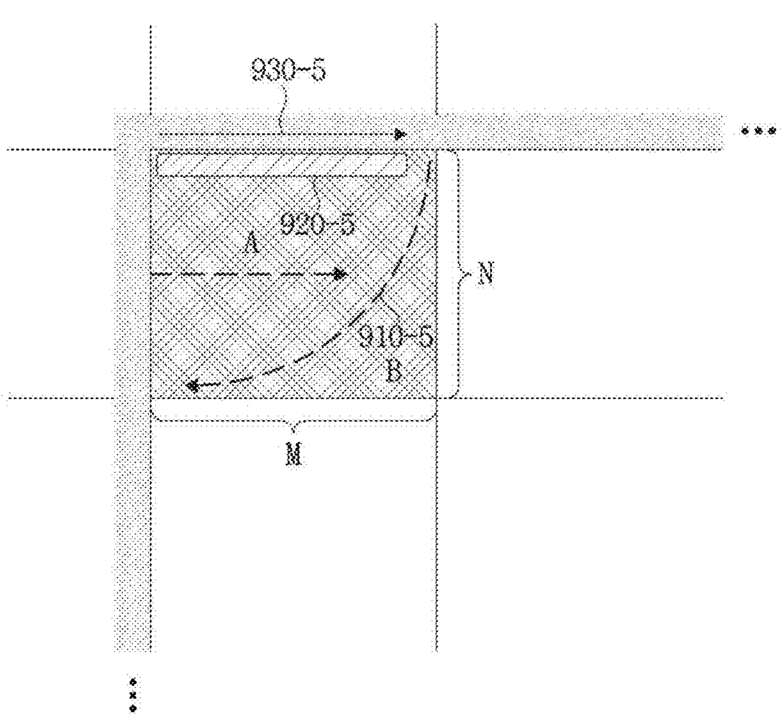
FIG. 48 is a diagram illustrating a method of filtering a topmost prediction sample column of a prediction block so as to remove discontinuity to a neighboring block, when performing intra prediction according to an embodiment of the present invention.

FIG. 48 is a diagram illustrating a method of filtering a topmost prediction sample column of a prediction block so as to remove discontinuity to a neighboring block, when performing intra prediction according to an embodiment of the present invention.

Among regions obtained by dividing a current intra prediction block in an M×N size with a curve or straight line, when a region subjected to horizontal direction prediction is positioned on the top of the prediction block, filtering is performed on a prediction sample in the topmost column of the prediction block.

When performing filtering on samples in the topmost column of the prediction block, a top reference sample variation is used.

For example, as shown in FIG. 48, when the prediction block is divided into two regions A and B by a curve 910-5, and the region A is subjected to horizontal direction prediction, filtering is performed on prediction samples in the topmost column 920-5 using a variation 930-5 in top reference samples.

Figure 49:
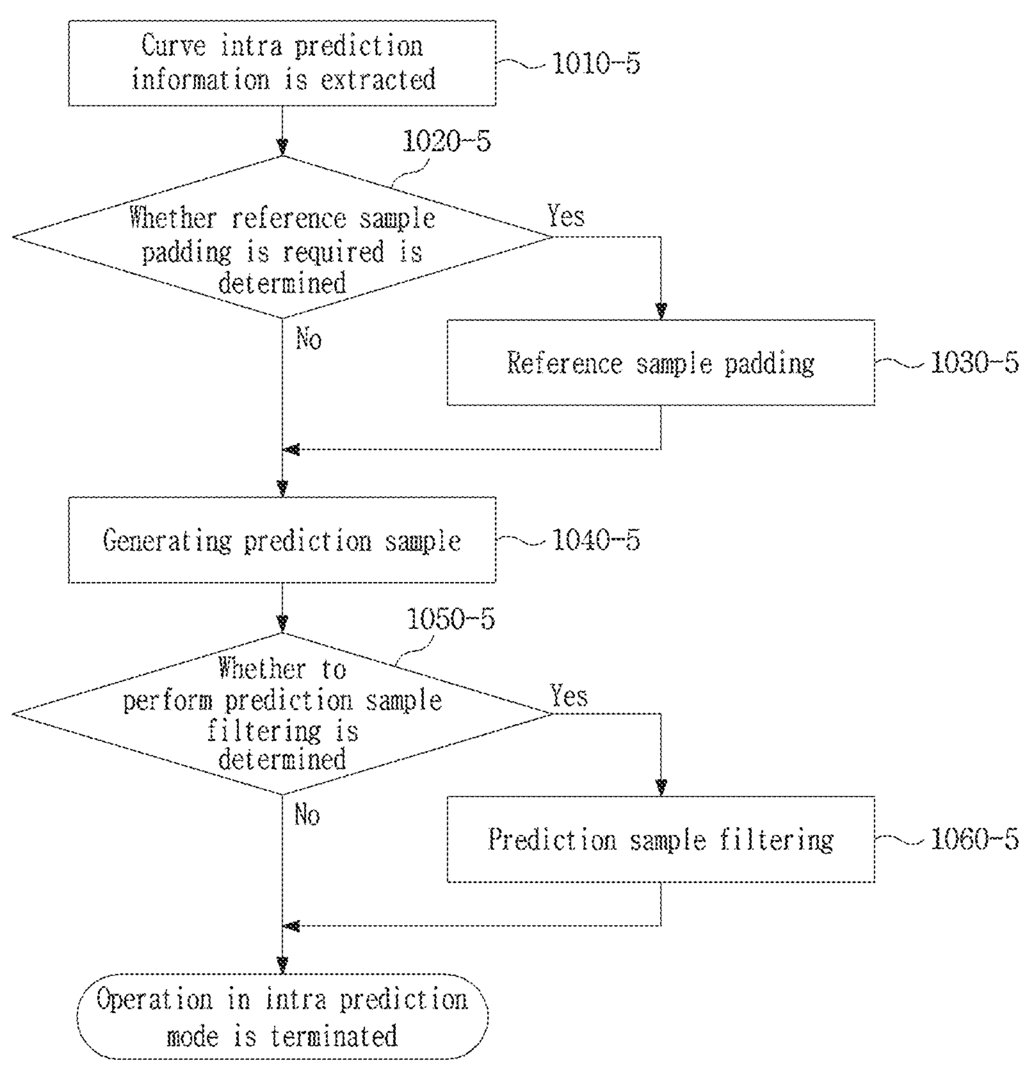
FIG. 49 is a flowchart illustrating a sequence of performing intra prediction according to an embodiment of the present invention.

FIG. 49 is a flowchart illustrating a sequence of performing intra prediction according to an embodiment of the present invention.

First, curve intra prediction information is extracted from the bitstream at step 1010-5. The extracted information may include a degree or coefficient of a curve equation for a curve equation for expressing the curve. By using the extracted information on the curve and information on whether the reference pixel of the neighboring block is present, whether reference sample padding is required is determined at step 1020-5. When reference sample padding is required, a non-existing reference sample is generated at step 1030-5 using an available reference sample of a neighboring block. When reference sample padding is not required, the prediction sample of the current intra prediction block is generated at step 1040-5 using the reference sample. In generating the prediction sample, the reference sample is determined using the extracted information on the curve. When generation of the prediction block is completed, whether to perform filtering on the prediction sample is determined at step 1050-5. Since the left region of the prediction block is subjected to vertical direction prediction or the top region of the prediction block is subjected to horizontal direction prediction, when filtering on the prediction sample is required, prediction sample filtering is performed at step 1060-5 using the variation in the neighboring reference sample. Filtering for the prediction sample may be performed on the leftmost sample column and the topmost sample row of the prediction block.

INDUSTRIAL APPLICABILITY

The present invention may be used in encoding/decoding a video signal.

The invention claimed is:

1. An intra prediction method for video decoding, comprising:

determining an intra prediction mode belonging to an initial directional prediction range for intra prediction of a M×N current block;

determining whether to modify the intra prediction mode from the initial directional prediction range into a modified directional prediction range based on a horizontal length (N) and a vertical length (M) of the M×N current block;

determining the modified intra prediction mode belonging to the modified directional prediction range; and performing the intra prediction of the M×N current block based on the modified intra prediction mode, wherein the initial directional prediction range comprises a first prediction range indicating center degrees, a second prediction range indicating higher degrees adjacent to the center degrees and a third prediction range indicating lower degrees adjacent to the center degrees, wherein the modified directional prediction range is determined to comprise the first prediction range, the second prediction range and a fourth prediction range indicating higher degrees other than the second prediction range, according to the vertical length (M) of the M×N current block, wherein the intra prediction of the M×N current block is performed by a top reference pixel column and a left reference pixel column of the M×N current block, and wherein a horizontal length of the top reference pixel column is larger than the horizontal length (N) of the M×N current block.

2. The method of claim 1, wherein the fourth prediction range is derived based on the third prediction range.

3. The method of claim 2, wherein the modified directional prediction range is determined to comprise the first prediction range, the third prediction range and a fifth prediction range indicating lower degrees other than the third prediction range, according to the horizontal length (N) of the M×N current block.

4. The method of claim 3, wherein the fifth prediction range is derived based on the second prediction range.

5. The method of claim 4, wherein the initial directional prediction range for intra prediction of the M×N current block is determined on the basis of an angle ranging from 45 degrees to 315 degrees.

6. An intra prediction method for video encoding, comprising:

determining an intra prediction mode belonging to an initial directional prediction range for intra prediction of a M×N current block;

determining whether to modify the intra prediction mode from the initial directional prediction range into a modified directional prediction range based on a horizontal length (N) and a vertical length (M) of the M×N current block;

determining the modified intra prediction mode belonging to the modified directional prediction range; and performing the intra prediction of the M×N current block based on the modified intra prediction mode, wherein the initial directional prediction range comprises a first prediction range indicating center degrees, a second prediction range indicating higher degrees adjacent to the center degrees and a third prediction range indicating lower degrees adjacent to the center degrees, wherein the modified directional prediction range is determined to comprise the first prediction range, the second prediction range and a fourth prediction range indicating higher degrees other than the second prediction range, according to the vertical length (M) of the M×N current block, wherein the intra prediction of the M×N current block is performed by a top reference pixel column and a left reference pixel column of the M×N current block, and wherein a horizontal length of the top reference pixel column is larger than the horizontal length (N) of the M×N current block.

7. The method of claim 6, wherein the fourth prediction range is derived based on the third prediction range.

8. The method of claim 7, wherein the modified directional prediction range is determined to comprise the first prediction range, the third prediction range and a fifth prediction range indicating lower degrees other than the third prediction range according to the horizontal length (N) of the M×N current block.

9. The method of claim 8, wherein the fifth prediction range is derived based on the second prediction range.

10. The method of claim 9, wherein the initial directional prediction range for intra prediction of the M×N current block is determined on the basis of an angle ranging from 45 degrees to 315 degrees.

11. A non-transitory computer-readable medium for storing a bitstream associated with a video signal, wherein the bitstream includes a M×N current block encoded by intra prediction, wherein the intra prediction of the M×N current block is performed based on a modified intra prediction mode, wherein the modified intra prediction mode belongs to a modified directional prediction range, wherein whether to modify an intra prediction mode from an initial directional prediction range into the modified directional prediction range is determined based on horizontal length (N) and a vertical length (M) of the M×N current block, wherein the intra prediction mode belongs to the initial directional prediction range, wherein the initial directional prediction range comprises a first prediction range indicating center degrees, a second prediction range indicating higher degrees adjacent to the center degrees and a third prediction range indicating lower degrees adjacent to the center degrees, wherein the modified directional prediction range is determined to comprise the first prediction range, the second prediction range and a fourth prediction range indicating higher degrees other than the second prediction range, according to the vertical length (M) of the M×N current block, wherein the intra prediction of the M×N current block is performed by a top reference pixel column and a left reference pixel column of the M×N current block, and wherein a horizontal length of the top reference pixel column is larger than the horizontal length (N) of the M×N current block.

* * * * *